(12) United States Patent
Smaardyk et al.

(10) Patent No.: US 9,267,359 B2
(45) Date of Patent: Feb. 23, 2016

(54) METHOD AND APPARATUS FOR INTERROGATING A SUBTERRANEAN ANNULUS

(75) Inventors: John Edward Smaardyk, Houston, TX (US); Donald Steinman, Missouri City, TX (US); Russel Hertzog, Georgetown, TX (US)

(73) Assignee: GE Oil & Gas Logging Services, Inc., Houston, TX (US)

( * ) Notice: Subject to any disclaimer, the term of this patent is extended or adjusted under 35 U.S.C. 154(b) by 763 days.

(21) Appl. No.: 13/332,543

(22) Filed: Dec. 21, 2011

(65) Prior Publication Data
US 2012/0119077 A1 May 17, 2012

Related U.S. Application Data

(63) Continuation-in-part of application No. 12/496,163, filed on Jul. 1, 2009.

(51) Int. Cl.
| | | |
|---|---|---|
| *G01V 5/12* | (2006.01) | |
| *E21B 43/04* | (2006.01) | |
| *G01V 5/10* | (2006.01) | |
| *G01F 1/704* | (2006.01) | |
| *E21B 47/00* | (2012.01) | |

(52) U.S. Cl.
CPC .............. *E21B 43/04* (2013.01); *G01V 5/125* (2013.01); *E21B 47/00* (2013.01); *G01F 1/7042* (2013.01); *G01V 5/101* (2013.01)

(58) Field of Classification Search
CPC ....... G01V 5/125; G01V 5/104; G01V 5/107; G01V 5/101; G01V 5/08; E21B 43/04
USPC ...................................................... 702/8, 11
See application file for complete search history.

(56) References Cited

U.S. PATENT DOCUMENTS

| | | | | |
|---|---|---|---|---|
| 4,342,911 | A * | 8/1982 | French | 250/258 |
| 4,661,700 | A * | 4/1987 | Holenka | 250/267 |
| 6,552,333 | B1 * | 4/2003 | Storm et al. | 250/269.3 |
| 6,648,083 | B2 * | 11/2003 | Evans et al. | 175/41 |
| 6,957,145 | B2 * | 10/2005 | Spross | 702/8 |
| 7,273,097 | B2 * | 9/2007 | Fox et al. | 166/250.02 |
| 2008/0061225 | A1 * | 3/2008 | Orban et al. | 250/269.3 |
| 2008/0116365 | A1 * | 5/2008 | Flecker | 250/261 |
| 2010/0017134 | A1 | 1/2010 | Steinman et al. | |
| 2011/0284732 | A1 * | 11/2011 | Korkin et al. | 250/269.3 |
| 2012/0119077 | A1 | 5/2012 | Smaardyk et al. | |

FOREIGN PATENT DOCUMENTS

| | | |
|---|---|---|
| GB | 2474381 A | 4/2011 |
| RU | 2305766 C1 * | 9/2007 |
| WO | 2009151350 A1 | 12/2009 |
| WO | 2010002458 A1 | 1/2010 |
| WO | 2011127156 A2 | 10/2011 |

OTHER PUBLICATIONS

Machine Translation of RU2305766, Belova.*
PCT Search Report and Written Opinion dated Nov. 20, 2013 from corresponding Patent Application No. PCT/US2013/050488.
Search Report from corresponding GB Application No. GB122790.6 dated Mar. 1, 2013.

* cited by examiner

*Primary Examiner* — John Breene
*Assistant Examiner* — Terence Stifter, Jr.
(74) *Attorney, Agent, or Firm* — Bracewell & Giuliani LLP

(57) ABSTRACT

Monitoring scattered gamma rays is used to identify substances disposed between coaxial tubulars disposed in a subterranean wellbore. Gamma rays are strategically directed from within an inner most tubular and into the annulus, some of the gamma rays scatter from the substance between the tubulars and are detected with detectors set a designated axial distance from the gamma ray source. Gamma rays also scatter from fluid within the tubular, a ratio of the gamma rays detected that scatter from the fluid in the tubular and from the substance can be used to determine the substance.

17 Claims, 17 Drawing Sheets

METHOD AND APPARATUS FOR INTERROGATING A SUBTERRANEAN ANNULUS

CROSS REFERENCE TO RELATED APPLICATIONS

This application is a continuation-in-part and claims the benefit of co-pending U.S. application Ser. No. 12/496,163 filed Jul. 1, 2009, the full disclosure of which is hereby incorporated by reference herein.

BACKGROUND

1. Field of Invention

The invention relates generally to investigating an annulus between tubulars disposed in a subterranean wellbore. More specifically, the present invention relates to a device and method that uses a radiation source for inspecting a subterranean annulus and a radiation detector for identifying a substance or substances in the annulus.

2. Description of Prior Art

Subterranean wellbores used for producing hydrocarbons typically are lined with a string of casing that is cemented to the formation intersected by the wellbore. Often an inner casing string is inserted within the casing string cemented in place. Fluid produced from the well flows to the surface within production tubing that is inserted into the inner casing string. Over the life of a typical well the production tubing may be removed so that remediation, repair, or flow enhancement operations may be commenced in the well. There may also be a need at some time for removal of a portion or for all of the casing.

Generally drilling fluids fill the annular space between the concentric tubulars. Particulates within the drilling fluids may settle out or precipitate over time and form a cement like substance that couples together the concentric tubulars and prevents the removal of the inner tubular from the wellbore. While cutting tools can sever the tubulars to enable removing the unstuck portion, the tubular cannot be removed if the cut is made at a depth below where the tubulars are adhered together. Alternatively, too shallow a cut can leave an undesirably long portion of free pipe extending above the point of adhesion.

SUMMARY OF THE INVENTION

Provided herein is a method of investigating a subterranean wellbore. In one example the method includes generating radiation from within a tubular that is disposed in the subterranean wellbore. The radiation is directed along a path that is oblique to an axis of the tubular allowing some of the radiation to pass through the tubular into an annulus circumscribing the tubular and scatter back into the tubular. Some of the radiation that scatters back into the tubular is detected and a count of the detected radiation is used to identify a material in the annulus. Alternatively, the radiation is a first set of radiation and the path is a first path. In this example the method further includes directing a second set of radiation along a second path that points away from the first path. Some of the second set of radiation scatter from fluid disposed in the tubular and are detected. Thus in an example embodiment identifying a material in the annulus is further based on a rate of detection of the second set of radiation. The radiation can be a gamma ray from a gamma ray source having an energy of from about 250 keV to about 700 keV. In this example, the scattered radiation when detected have an energy of from about 50 keV to about 350 keV. In an alternate embodiment the method can also include detecting a substantially solid material in the annulus when a ratio of the rate of detection of the first set of radiation over the rate of detection of the second set of radiation remains substantially the same with changes in the thickness. In one example, the material in the annulus is a light weight cement.

Also included herein is a method of interrogating an annulus between an inner and outer coaxially disposed tubulars that includes providing a gamma ray source against an azimuthal section of the inner tubular. The method also includes directing gamma rays from the source so that some of the gamma rays travel into the annulus and scatter from a material in the annulus back into the inner tubular. In this example some of the gamma rays travel away from the azimuthal section and scatter from a fluid in the inner tubular. The gamma rays that scatter back can be detected, the method can also include classifying by energy range those gamma rays that scatter from the fluid in the inner tubular and that scatter from the material in the annulus and identifying the material in the annulus based on a rate of detection of the scattered gamma rays. In an alternative, a conically shaped guide is provided proximate the gamma ray source and positioned so that an aperture of the guide is directed towards the source and the guide has an axis that is substantially parallel with an axis of the inner tubular. The detector can be disposed from about 2 inches to about 4 inches from the gamma ray source and wherein the detector is used to detect the scattered gamma rays. In an example, a collimator is used to strategically direct the gamma rays away from the source at an angle oblique to an axis of the inner tubular and along discrete paths disposed azimuthally around the gamma ray source, so that strategically located detectors respectively detect scattering from discrete azimuthal areas spaced radially outward from the gamma ray source. Optionally, a rate of detection of gamma rays scattering from fluid in the wellbore is used as a reference for determining the material in the annulus. The steps of generating and detecting can be repeated at different depths in a section of the wellbore. A substantially solid material in the annulus can be identified when a ratio of a rate of gamma rays detected that are scattered from the annulus over a rate of gamma rays detected that are scattered from the fluid in the inner tubular remains substantially the same with changes in thickness of the annulus. Optionally, a fluid can be identified in the annulus when a gamma ray rate detection ratio reduces with a reduction in thickness of the annulus.

A method of analyzing an annulus between an inner tubular and an outer tubular that are coaxially disposed in a subterranean wellbore is provided herein that includes providing a gamma ray source against an azimuthal section of the inner tubular and directing gamma rays from the source so that some of the gamma rays travel through the sidewalk into the annulus and scatter from a material in the annulus back into the inner tubular, and so that some of the gamma rays travel away from the azimuthal section and scatter from a fluid in the inner tubular. In this example the scattered gamma rays are detected that scatter from the fluid in the inner tubular and that scatter from the material in the annulus and are classified. The material in the annulus is identified based on a rate of detection of the scattered gamma rays. The steps of this method can be repeated at different depths in a section of the wellbore and a substantially solid material identified in the annulus when a ratio of a rate of gamma rays detected that are scattered from the annulus over a rate of gamma rays detected that are scattered from the fluid in the inner tubular remains substantially the same with changes in thickness of the annulus. A substantially liquid material is identified in the annulus when a ratio of a rate of gamma rays detected that are scattered from the annulus over a rate of gamma rays detected that are scattered from the fluid in the inner tubular is reduced with a reduction in thickness of the annulus. In one alternative the detection rate of gamma rays that are scattered from the fluid in the tubular is a reference value for use in identifying a liquid in the annulus.

BRIEF DESCRIPTION OF DRAWINGS

Some of the features and benefits of the present invention having been stated, others will become apparent as the description proceeds when taken in conjunction with the accompanying drawings, in which.

Figure 1:
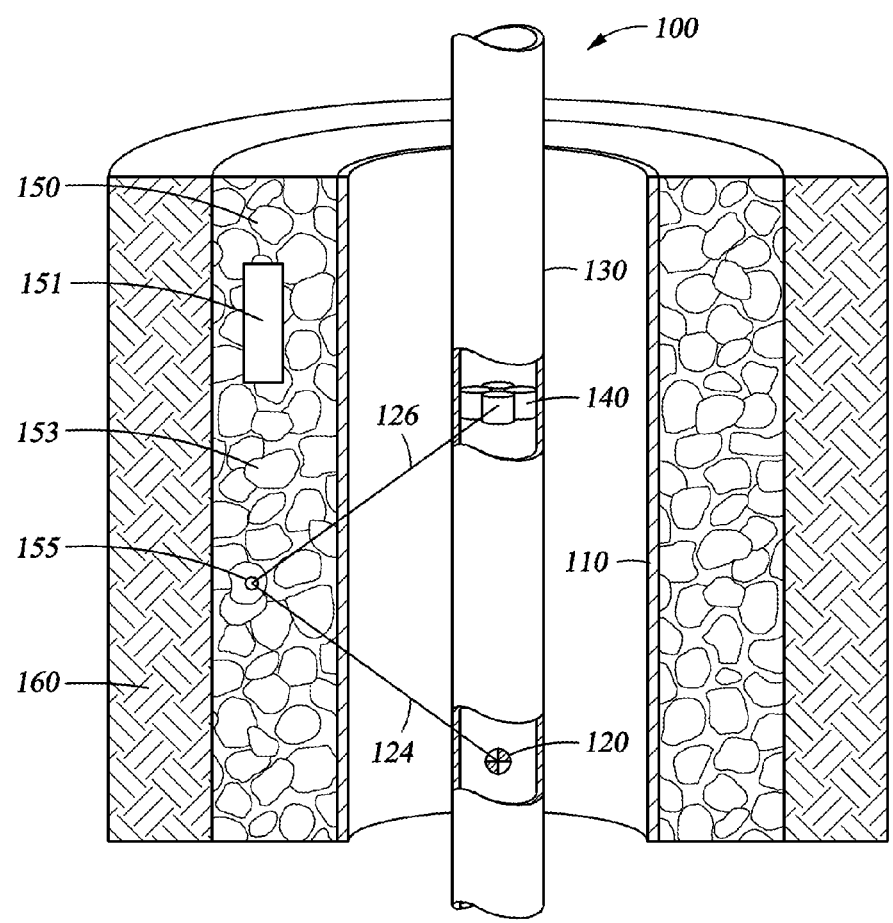
FIG. 1 a schematic of an example embodiment of a downhole imaging tool having a low energy radiation source and detectors disposed in a wellbore in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

Referring now to FIG. 1 a downhole imaging tool 100 is shown positioned in a "base-pipe" or inner steel housing 110 of a gravel pack. It is recognized that a tool housing 130 may be constructed of any light metal wherein the term, "light metal," as used herein, refers to any metal having an atomic number less than 23. Downhole imaging tool 100 includes at a minimum a housing or pipe 130 carrying a low energy radiation source 120 and plurality of detectors 140. In one example embodiment, gamma radiation source 120 is centrally located in housing 130. Optionally, detectors 140 are symmetrically spaced apart azimuthally at a constant radius, but also positioned within housing 130. In other words, in one example, the radius on which detectors 140 are spaced apart is less than the radius of the housing 130. Radiation source 120 emits radiation, in this case, gamma rays 124 into gravel pack 150.

The alternating hatching of gravel pack 150 indicates possible regions of gravel pack that could be gravel-filled or not. For example, center region 151 may constitute a void in gravel pack 150 that has been filled with completion fluids or production fluids whereas other regions 153 may constitute portions of the gravel pack that are properly completed or filled in. Of course, those skilled in the art, with the benefit of this disclosure, will appreciate that the foregoing regions are for illustrative purposes only and that a void or vug could take any shape and any position relative to tool 100.

In the example of FIG. 1, gamma rays 124 propagating into gravel pack 150 are Compton scattered (as at point 155), with a loss of some energy, back towards detectors 140 located within downhole imaging tool 100. Upon scattering the gamma rays, they become lower energy gamma rays 126, which are detected by detectors 140. The count-rate intensity of Compton scattered gamma rays 126 depends on, among other factors, the density of the gravel pack material. Hence, higher count rates represent higher density in the gravel pack, whereas lower count-rates represent lower density as a result of fewer gamma rays being back-scattered towards the detectors.

In an example, radiation source 120 includes barium, cesium, some other low energy radiation source, or combinations thereof. By utilizing a low energy source such as this, energy is only propagated a short distance into the gravel pack immediately adjacent a screen. For this same reason, in one example detectors 140 are positioned in housing 130 proximate to radiation source 120. In one example embodiment, radiation source 120 and detectors 140 are within about 3 to about 3.5 inches apart along the length of tool 100.

Shielding (not shown in FIG. 1) may be applied around radiation source 120 to collimate or otherwise limit the emission of radiation from radiation source 120 to a limited longitudinal segment of gravel pack 150. In an embodiment, such shielding is a heavy metal shield, such as sintered-tungsten, which collimates the pathway for the emitted gamma rays into the gravel pack. Likewise, as described in more detail below, similar shielding may be used around each detector to limit the detector viewing aperture to only those gamma rays that are primarily singularly scattered back to the detector from a specific azimuthal section of the gravel pack.

Further, the energy levels of the emitted gamma rays 124 may be selected to assess gravel pack density at varying depths or distances from downhole imaging tool 100. As one example, the radiation from a low-energy gamma ray source, such as a $^{133}$Ba source, may be used to emit various energy levels. Alternatively, a gamma ray radiation source with an energy close to that of $^{137}$Cs may be used.

Techniques for converting radiation count rates into a complete 2D profile map of the gravel pack integrity include the SYSTAT's Table Curve 3D method. Other techniques include, but are not limited to, MATLAB, IMAGE, and advanced registration and techniques for making mosaic representations from data points can be used to map the basepipe and gravel-pack environment. Also, 3D geostatistical-based software can be adapted to convert the basic gamma-ray count rates to generate a map of the gravel-pack environment. In this way, the integrity of a gravel pack or formation may be determined.

To produce accurately oriented maps, the azimuthal angle of the logging tool relative to the high side of the borehole is determined. This orientation can be determined using any orientation device known in the art. Orientation devices may contain one or more orientation sensors used to determine orientation of the logging tool with respect to a reference plane. Examples of suitable orientation devices include, but are not limited to, those orientation devices produced by MicroTesla of Houston, Tex. Each set of gamma ray measurements may be associated with such an orientation so that a 2D profile map of the gravel pack can be accurately generated in terms of the actual azimuthal location of the material in the gravel pack.

Figure 2:
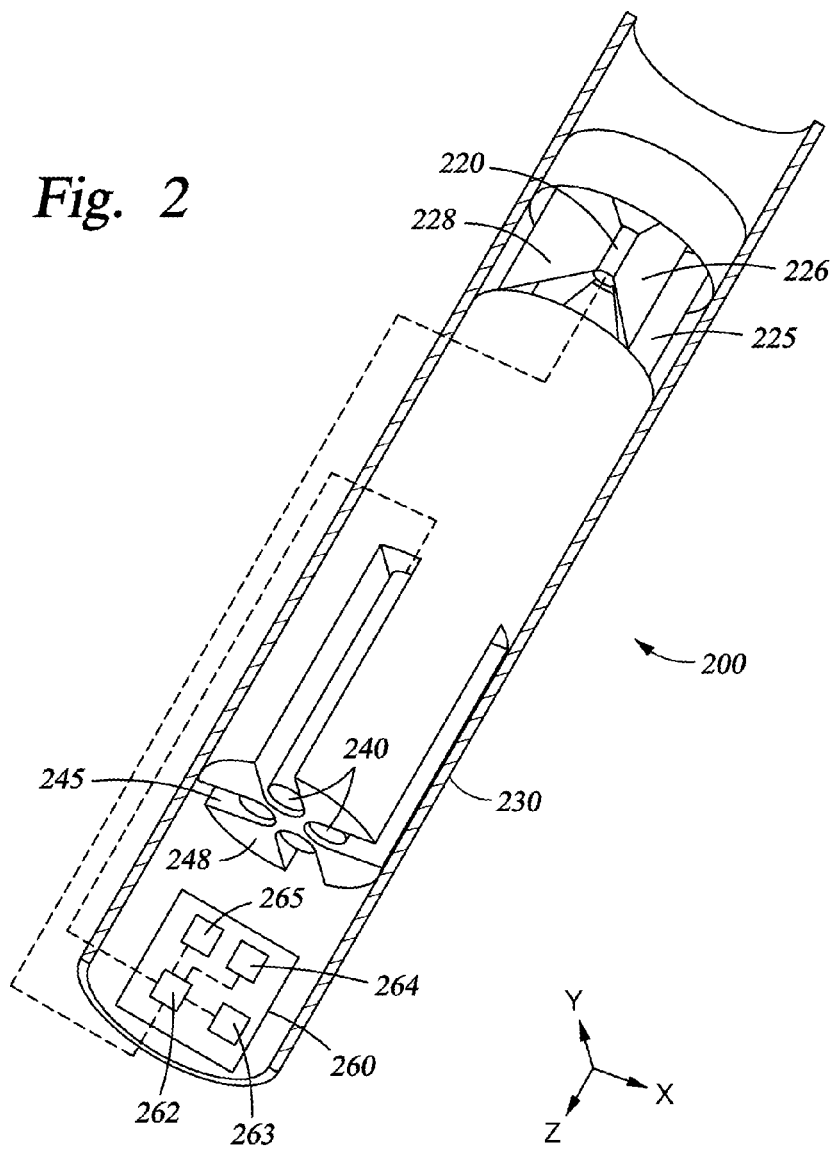
FIG. 2 is a perspective view of one embodiment of the tool of FIG. 1.

FIG. 2 illustrates a perspective view of one embodiment of a gravel pack imaging tool. As shown, downhole imaging tool 200 includes a housing 230 which carries radiation source 220, source collimator 225, and a plurality of radiation detectors 240 in an array. The array of detectors 240 may be positioned at a fixed distance from radiation source 220. In certain embodiments, detector arrays may be positioned at differing distances from radiation source 220. Additionally, detector arrays on either side of radiation source 220 is also envisioned in certain embodiments. Electronics 260 may also be located in housing 230 or wherever convenient.

Radiation source 220 may be one or more radiation sources, which may include any suitable low-energy gamma ray source capable of emitting gammy ray radiation from about 250 keV to about 700 keV. Gamma ray sources suitable for use with embodiments of the present invention may include any suitable radioactive isotope including, but not limited to, radioactive isotopes of barium, cesium, a LINAC, high energy X-rays (e.g. about 200+ keV), or any combination thereof. Radiation from radiation source 220 may be continuous, intermittent, periodic, or in certain embodiments, amplitude, frequency, phase modulated, or any combination thereof.

In one example embodiment, radiation source 220 is centrally located in housing 230. In the illustrated embodiment, source 220 is positioned along the axis of housing 230.

Gamma-Ray collimator 225, which is optional in certain embodiments, may be-configured adjacent to the source 220 in order to directionally constrain radiation from the radiation source 220 to an azimuthal radiation segment of the gravel pack. For example, collimator 225 may include fins or walls 226 adjacent source 220 to direct gamma ray propagation. By directing, focusing, or otherwise orienting the radiation from radiation source 220, radiation may be guided to a more specific region of the gravel pack. It is appreciated that in certain embodiments, a heavy-met shutter mechanism could be further employed to direct radiation from radiation source 220. Additionally, the radiation energy may be selected, by choosing different isotopic sources, so as to provide some lithological or spatial depth discrimination.

In the illustrated embodiment, collimator 225 constrains radiation from source 220. In this embodiment, collimator 225 is also conically shaped as at 228, in the direction of detectors 240 to collimate the gamma rays from source 220. Of course, those skilled in the art will appreciate that collimator 225 may be configured in any geometry suitable for directing, focusing, guiding, or otherwise orienting radiation from radiation source 220 to a more specific region of the gravel pack.

In one non-limiting example, the radiation transmitted from source 220 into a gravel pack (such as gravel 150 of FIG. 1) is Compton scattered back from the gravel pack to tool 200 where the back-scattered radiation may be measured by radiation detectors 240. Radiation detectors 240 can be any plurality of sensors suitable for detecting radiation, including gamma ray detectors. In the illustrated embodiment, four detectors are depicted, although any number of detectors can be utilized. In another example embodiment, three detectors or six detectors are utilized; where optionally, each detector is disposed to "view" a different segment of the gravel pack. Employing multiple detectors, the tool can image the entire circumference of the gravel pack in separately identifiable segments. The resolution of the image of the overall circumference can depend on the number of detectors, the energy of the gamma rays and the degree of shielding provided around each detector.

In certain embodiments, gamma ray detectors may include a scintillator crystal that emits light proportional to the energy deposited in the crystal by each gamma ray. A photomultiplier tube may be coupled to the crystal to convert the light from the scintillation crystal to measurable electron current or voltage pulse, which is then used to quantify the energy of each detected gamma ray. In other words, the gamma rays are quantified, counted, and used to estimate the density of the gravel pack adjacent a screen. Photomultiplier tubes may be replaced with high-temperature charge-coupled device (CCD) or micro-channel photo-amplifiers. Examples of suitable scintillator crystals that may be used include, but are not limited to, NaI crystals, NAI(Tl), BGO, and Lanthanum-bromide, or any combination thereof. In this way, count-rates may be measured from returned radiation, in this case, returned gamma rays. The intensity of the Compton scattered gamma rays depends on, among other factors, the density of the gravel pack material. Hence, lower density represents gaps in the gravel pack and lower count-rates represent lower density as a result of fewer gamma rays being back-scattered towards the detectors.

In an example embodiment, detectors 240 are mounted inside a housing at a radius smaller than the radius of housing 230 inset from the surface of housing 230. Likewise, while they need not be evenly spaced, in the illustrated embodiment, detectors 240 are evenly spaced on the selected radius. Although the illustrated example shows four detectors 240 spaced apart 90 degrees from one another, those skilled in the art will appreciate that any number of multiple detectors can be utilized in the invention. Further, while the embodiment illustrates all of the detectors 240 positioned at the same distance from source 220, they need not be evenly spaced. Thus, for example, one detector (or a multi-detector array) might be spaced apart 12 centimeters from the source, while another detector (or a detector array) spaced apart 20 centimeters from the source or any other distance within the tool.

Similarly, in another embodiment, detectors 240 can be positioned both above and below source 220. In such a case, collimator 225 would be appropriately shaped to guide gamma rays in the direction of the desired detectors. In such embodiments with multiple detectors disposed on both sides of the radiation source, additional shielding may be provided between the collimators to prevent radiation scattering (i.e. cross-contamination of the radiation) from different segments of the gravel pack.

Each detector 240 may be mounted so as be shielded from the other detectors 240. While any type of shielding configuration may be utilized for the detectors 240, in the illustrated embodiment, collimator 248 is provided with a plurality of openings or slots 245 spaced apart around the perimeter of collimator 248. Although openings 245 could have any shape, such as round, oval, square or any other shape, in one example embodiment openings 245 are shaped as elongated slots and will be referred to as such herein.

A detector 240 is mounted in each slot 245, so as to encase detector 240 in the shield. The width and depth of the slot 245 can be adjusted as desired to achieve the desired azimuthal range. In certain embodiments the length of slots 245 can be as long as the sensitive region of the gamma-ray detector (e.g. the crystal height). It will be appreciated that since a detector is disposed within the slot, the detector is not on the surface of the collimator where it might otherwise detect gamma rays from a larger azimuthal range. In an example embodiment, slot 245 is 360/(number of detectors) degrees wide and the detector face to inner diameter of the pressure housing is a few millimeters deep (e.g. from about 2 to about 5 mm). However, tighter collimation is possible. Optionally, the azimuthal range of each slot is limited to 360/(number of detectors) degrees. In this way, the view of each radiation detector 240 may be more focused on a particular region of the gravel pack. Additionally, such shielding eliminates or at least mitigates radiation scattered from one detector to another detector. As can be seen, each detector is separated from one another by radiation absorbent material. By eliminating detector-to-detector radiation scattering, more precise azimuthal readings are achieved.

While source collimator 225 is shown as a single, integrally formed body, having fins 226, conical surface 228, it need not be and could be formed of separate structural components, such as a source collimator combined with a detector collimator 248, so long as the shielding as described herein is achieved.

In the illustrated embodiment, the region of housing 230 around the opening in source collimator and detectors 240 may be fabricated of beryllium, aluminum, titanium, or other low atomic number metal or material, the purpose of which is to allow more of the gamma rays to enter detectors 240. This design is especially important for lower energy gamma rays, which are preferentially absorbed by any dense metal in the pressure housing.

Alternatively, or in addition to detector shielding or collimator 248, an anti-coincidence algorithm may be implemented in electronics 260 to compensate for detector-to-detector radiation scattering. In this way, a processor can mitigate the effects of multiply-detected gamma rays via an anti-coincidence algorithm. In certain embodiments, electronics 260, 262, and 264 are located above detectors 240 or below source 220.

Electronics 260 may include processor 262, memory 263, and power supply 264 for supplying power to gravel pack imaging tool 200. Power supply 264 may be a battery or may receive power from an external source such as a wireline (not shown). Processor 262 is adapted to receive measured data from radiation detectors 240. The measured data, which in certain embodiments includes count rates, may then be stored in memory 263 or further processed before being stored in memory 263. Processor 262 may also control the gain of the photomultiplier or other device for converting scintillations into electrical pulses. Electronics 260 may be located below source 220 and above detectors 240 or removed therefrom.

In one embodiment, the tool further includes an accelerometer, a 3 axis inclinometer or attitude sensor to unambiguously determine the position of an azimuthal segment. In certain embodiments, a compass device may be incorporated to further determine the orientation of the tool.

Gravel pack imaging tool 200 may be constructed out of any material suitable for the downhole environment to which it is expected to be exposed, taking into account in particular, the expected temperatures, pressures, forces, and chemicals to which the tool will be exposed. In certain embodiments, suitable materials of construction for source collimator 225 and detector collimator 248 include, but are not limited to, heavy-met, lead, dense and very-high atomic number (Z) materials, or any combination thereof.

Further, while a 1 11/16 inch diameter configuration tool is illustrated, the tool 100 can be sized as desired for a particular application. Those skilled in the art will appreciate that a larger diameter tool would allow more detectors and shielding to provide further segmentation of the view of the gravel pack.

This tool may be deployed to measure the integrity of the gravel pack in new installations and to diagnose damage to the gravel pack from continuing production from the well. A person of ordinary skill in the art with the benefit of this disclosure will appreciate how to relate the log results of count rates and inferred densities of gravel pack material to the structure of the pack and to reason from the results to the condition of the pack.

Figure 3A:
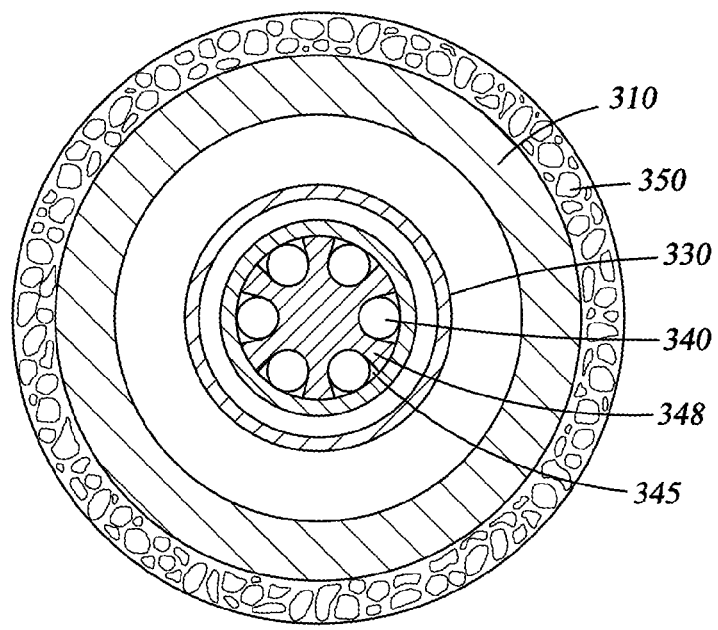
FIGS. 3A and 3B are sectional views of an example embodiment of the tool of FIG. 2.
Figure 3B:
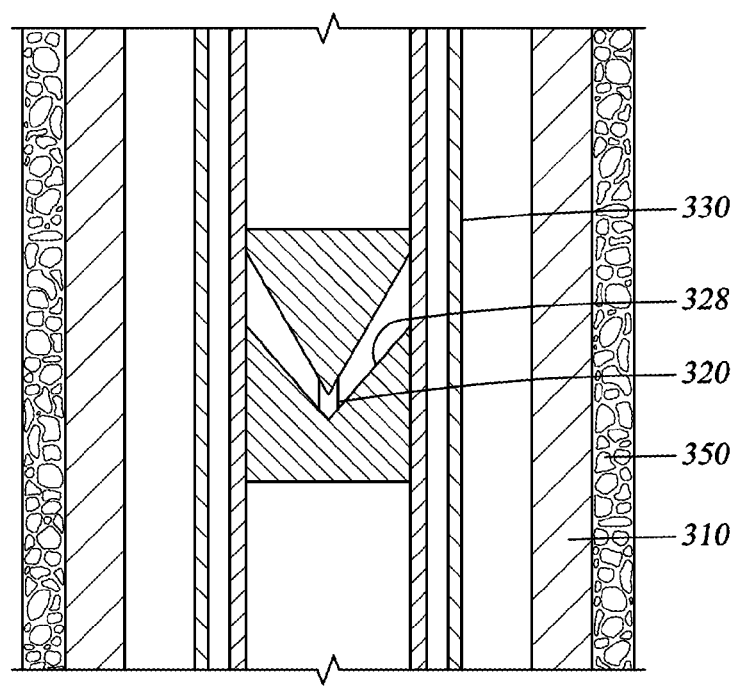

As a further illustration of an exemplary geometry of the embodiment illustrated in FIG. 2, FIGS. 3A and 3B show cross-sectional views of another embodiment of the tool disposed in base pipe or screen 330, which is further disposed in casing 310, which is further disposed in gravel pack 350, where FIG. 3A shows a cross-section taken from the X-Y plane and where FIG. 3B shows a cross-section taken from the X-Z plane. As shown in the illustrated embodiment, source collimator 328 is conical shaped in the X-Z plane or Y-Z plane. Detector 340 is shown in FIG. 3A in openings or slots 345, whereas radiation source 320 is shown depicted in FIG. 3B. As shown in FIG. 3A, detector collimators 348 are fan-shaped in the X-Y plane and rectangular in the X-Z or Y-Z planes. In certain embodiments, a conical source collimator 328 is desirable as it reduces multiple scattering events in the gravel pack.

Methods of using the present invention may include the use of different energy windows to discriminate the gravel pack in low to high density completion fluids. In certain embodiments, at least three energy windows are used where each window depends on the source energy. For example, for a Cs source (662 keV), the Low Energy (LE) window (typically from about 50 keV to about 200 keV) is sensitive to multiple scattered source gamma-rays, whereas the High Energy (HE) window (typically from about 200 keV to about 350 keV) is sensitive to single-scattered source gamma rays. A Broad Window (BW) typically may include gamma rays in the range of about 50 keV to about 350 keV. The BW count rate has the highest statistical precision and is used for the base gravel pack imaging. The LE and HE windows may be used for specific applications, such as deep-reading and maximum-dynamic-range imaging capabilities. Combinations of these different energy window logs can be combined using special methods (e.g. ad-hoc adaptive or Kalman-type processing algorithms) for enhanced precision and resolution. It is recognized that multiple-intensity energy sources may be utilized in the same tool, either simultaneously or sequentially.

In addition to the energy levels of the radiation source, other factors that may be adjusted to discriminate segmented views of the gravel pack include, but are not limited to the angle of the collimators and the source to detector spacing. Examples of suitable angles of the source collimator include, but are not limited to, angles from about 15 degree to about 85 degree and from about 65 degree to about 85 degree in other embodiments. Examples of suitable source to detector spacing include, but are not limited to, from about 1 inch to about 3.5 inches to about 8 inches, and in other embodiments, from about 6 inches to about 10 inches, and in still other embodiments to about 12 inches.

Radioactive tracers may be used in conjunction with certain embodiments to produce enhanced images of the gravel pack. The introduction of radioactive tracers allows production of an image of the azimuthally distributed radioactive tracer material. Radioactive tracers may be attached to the gravel pack before building the gravel pack or as the gravel pack is being placed. Alternatively, radioactive tracers may be injected or otherwise introduced into the gravel pack after installation of the gravel pack (e.g. as a fluid or slurry). More generally, radioactive tracers may be introduced into any portion of the formation as well.

Where radioactive tracer material is attached to the gravel itself before placement, void areas show up on the images as low count-rate (or "dark") regions, whereas where the radioactive tracer material is injected as a fluid or slurry, void areas void areas show up on the images as high count-rate ("bright") regions within the gravel pack. Further image enhancement may be achieved by using a variety of tracers to create a multiple-isotope log. When used for this purpose, source 320 in FIG. 3, 220 in FIG. 2, or 120 in FIG. 1 may be omitted from the tool. Alternatively, tracer radioactivity may be determined in the presence of the radiation source or multiple tracers can be identified by using the energy discrimination capability of electronics 260.

Moreover, it is recognized that the downhole tool is capable of measuring count rates while being lowered or raised in the wellbore. In certain embodiments, the downhole tool may perform measurements while the tool is stationary in the wellbore. Exemplary raising and lowering rates include displacement rates of up to about 1800 feet/hour.

To facilitate a better understanding of the present invention, the following examples of certain aspects of some embodiments are given. In no way should the following examples be read to limit, or define, the scope of the invention.

EXAMPLES

Figure 4:
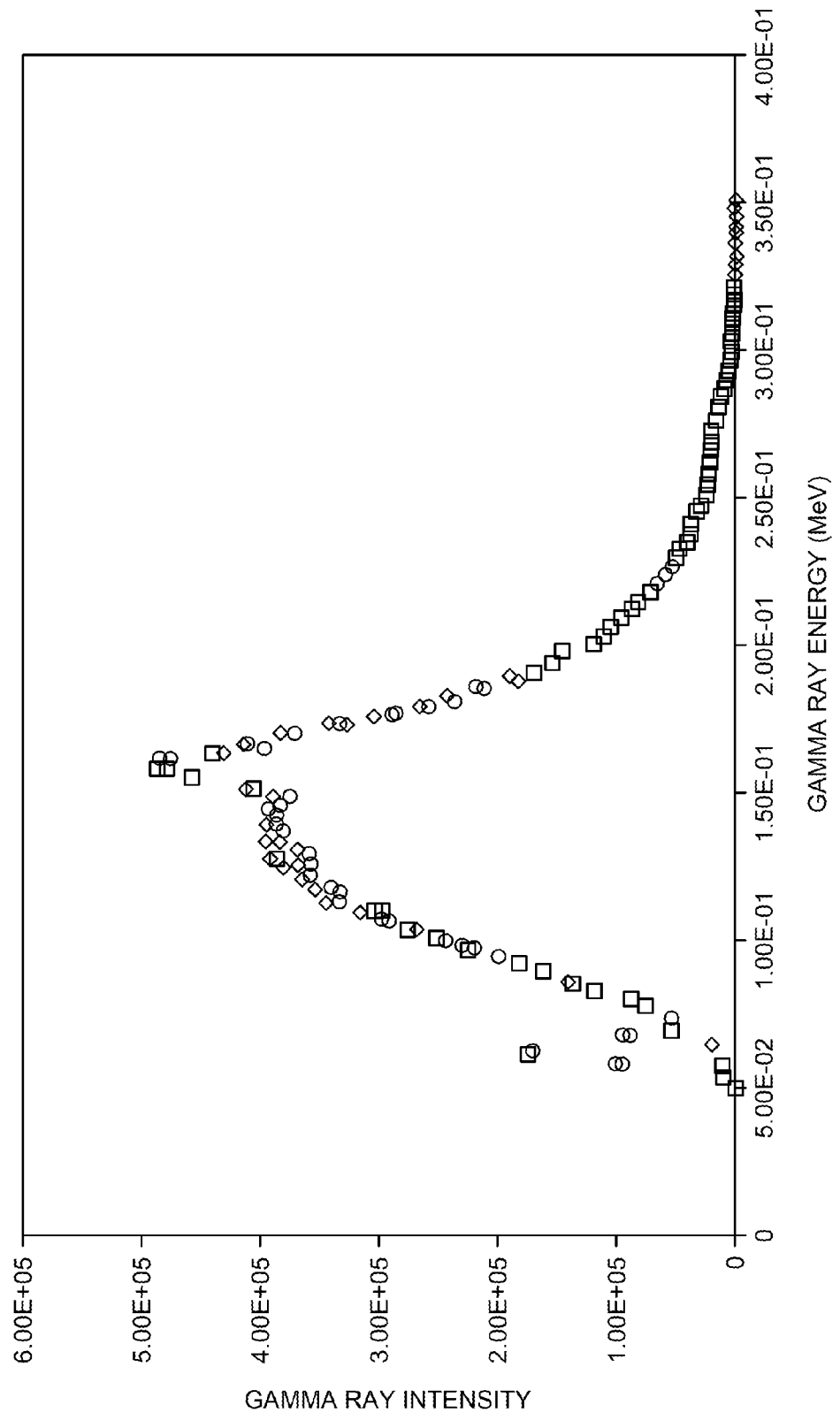
FIG. 4 is an example of a graph that represents a source response in a gravel pack for Barite-Sag detection.

In one non-limiting example of use, FIG. 4 depicts a graph of a spectrum of gamma rays incident on one of the detectors as a response to being scattered in a gravel pack. Here, typical gamma ray intensity is shown plotted versus gamma ray energy (MeV). This graph shows an MCNP-modeled detector energy spectrum simulation of an actual tool resulting from the $^{133}$Ba 356 keV gamma ray Compton back scattered in various gravel pack scenarios. This graph signifies an advantage of choosing a low-energy gamma source. By using an energy source that is low enough, one can ensure that the gravel-pack tool is sensitive primarily to the near-region variations of the gravel pack and not significantly affected by scattering in deeper regions of the cement around the casing or the formation and subsequent formation density variations. However, in cases of thick base pipes and metal screens between the gravel pack and the gravel-pack tool detectors, the source energy must be sufficiently high to penetrate into the gravel-pack screen. In this way, gravel pack imaging tools may be designed to "focus" on particular depths or portions of a gravel pack.

Figure 5:
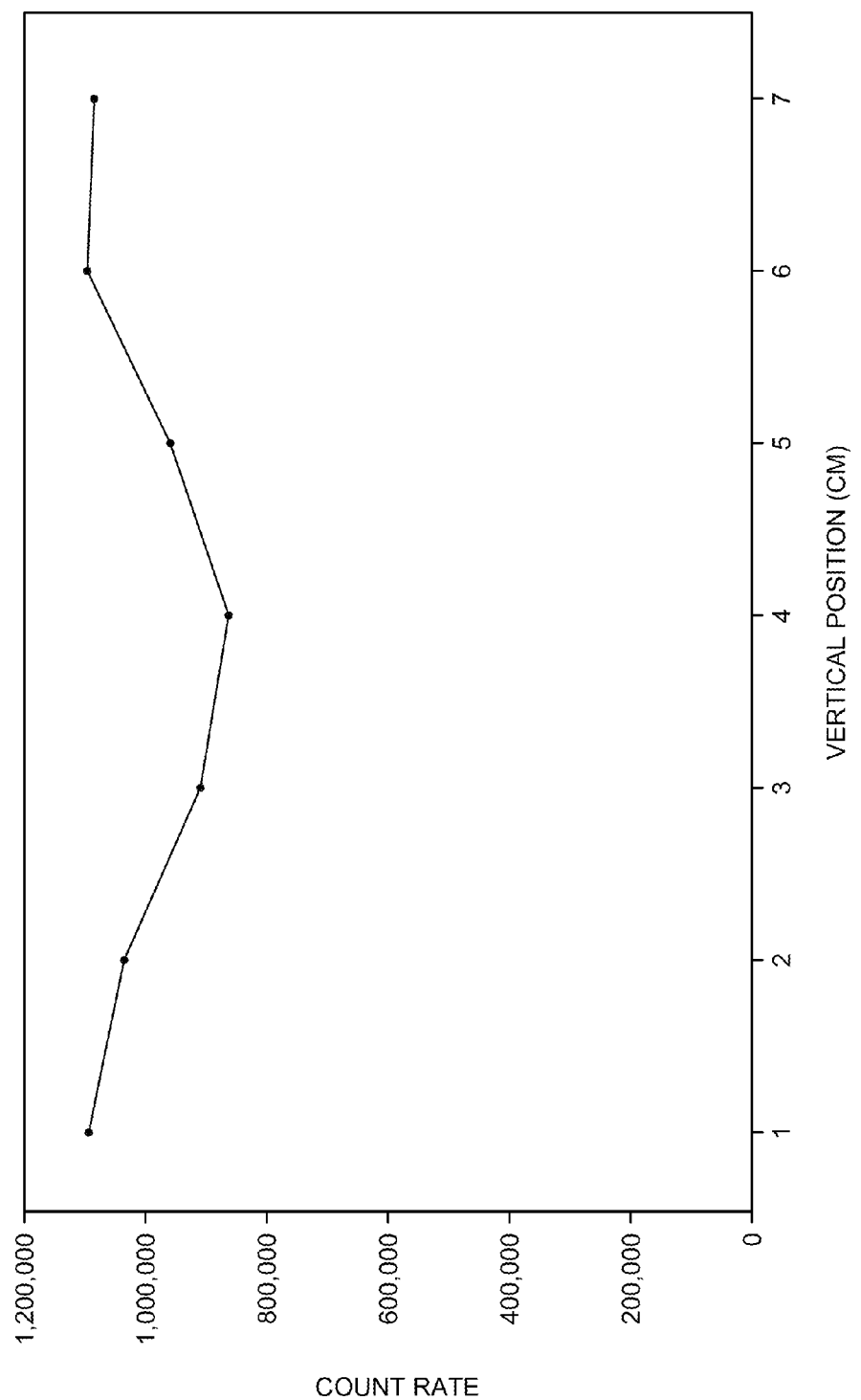
FIG. 5 is a graph of a count rate versus depth measured by an example embodiment of an imaging tool in accordance with the present invention.

In one non-limiting example of use, FIG. 5 shows a graph of a count rate versus depth in centimeters as measured by a 3.5 inch gravel-pack imaging tool in a 7 inch gravel pack. These logs were produced by processing individual detector gamma-ray count rates. The plot in FIG. 5 is an MCNP-modeled example of the count-rate sensitivity to a 1-inch annulus wash out in a gravel pack centered at a depth index of 4-centimeters. It shows significant sensitivity to changes in the gravel pack density. Qualitative image logs will be produced by displaying the relative count rates from each detector sector at each depth. Another means of analyzing the counts can be used to compute a more quantitative multi-sector density (i.e. in grams/cc) profile. Such a density log can be derived from the count rates by using a calibrated logging count rate-to-density algorithm.

Notably, traditional prior art density tools used to measure the gravel pack generally have a relatively large spacing between the source and the detector. The reason for this is that the tool is provided to evaluate the entire gravel pack. The source and detector are both typically located centrally in the tool along the tool's axis. Shielding may be provided along the axis between the source and the detector to prevent energy coupling between the two, i.e., energy passing directly from the source to the detector without scattering within the gravel pack. In the prior art, because of the relatively large spacing between the source and detector, the gamma ray radiation undergoes significant multiple scattering and absorption before it is detected and counted. The more dense the gravel pack, the fewer counts that are recorded. In other words, in the tools of the prior art, the count rate decreases with gravel pack density because the multiple scattering and absorption attenuates the total amount of radiation measured by the detectors.

In one example embodiment of the device and method of the present disclosure, the source and the detectors are closely positioned to one another, such as about 3.5 inches apart.

Because of this close physical relationship, energy propagated into the gravel pack and scattered back to the detector undergoes much less scatter, i.e., typically only a single scatter (back to the detector) as opposed to multiple scattering. In fact, the count rates increase with the density of the gravel pack utilizing the tool of the invention. This is significant because this means that the radiation does not undergo the attenuation associated with tools of the prior art.

Moreover, the prior art does not utilize a conically shaped collimator to direct the energy propagated into the gravel pack. Again, by utilizing such a collimator in the prior art tool, multiple scattering can be minimized and improve upon the imaging of the prior art tools.

Figure 6:
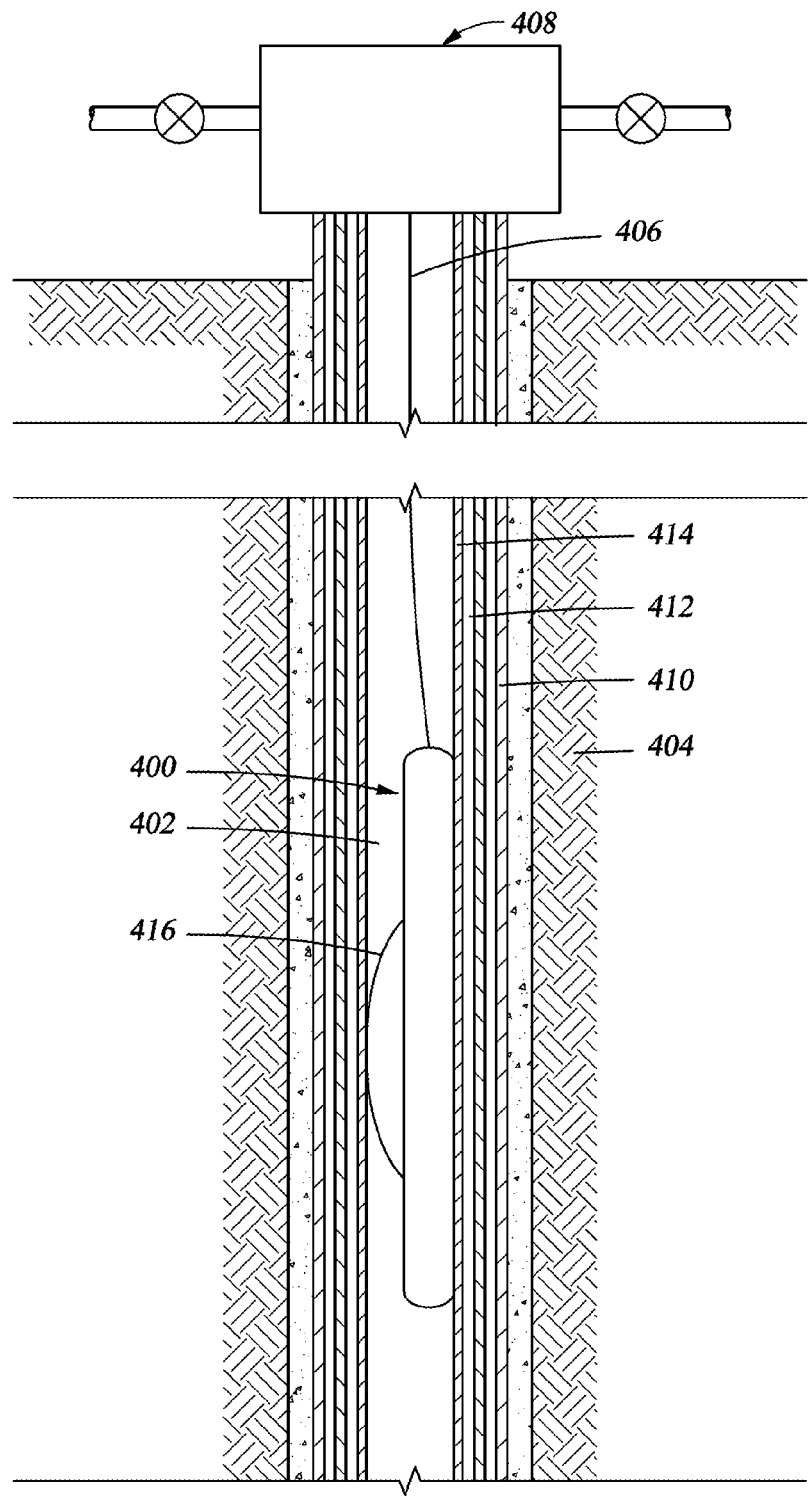
FIG. 6 is a side sectional view of an alternate example embodiment of the tool of FIG. 1 disposed in a cased wellbore in accordance with the present invention.

Referring now to FIG. 6, a partial side sectional view is provided illustrating an example embodiment of the tool 400 disposed in a wellbore 402 that intersects a formation 404. The tool 400 is suspended on wireline 406, that may be threaded through a wellhead assembly 408 shown set on the surface and at the opening to the wellbore 402. Optionally, the tool 400 could be deployed on tubing, slick line, cable, or any other known or later developed deployment means. An outer casing 410 that can be cemented to the formation 404, lines the wellbore 402 and an inner casing 412 is shown coaxially inserted within outer casing 410. The tool 400 is suspended within production tubing 414 that inserts within the inner casing 412; a decentralizer 416 shown mounted on a lateral side of the tool 400 for urging the tool 400 up against the inner surface of the production tubing 414. In one example, and as described in more detail below, decentralizing the tool 400 enhances imaging of the annular spaces between concentric tubulars.

Figure 7:
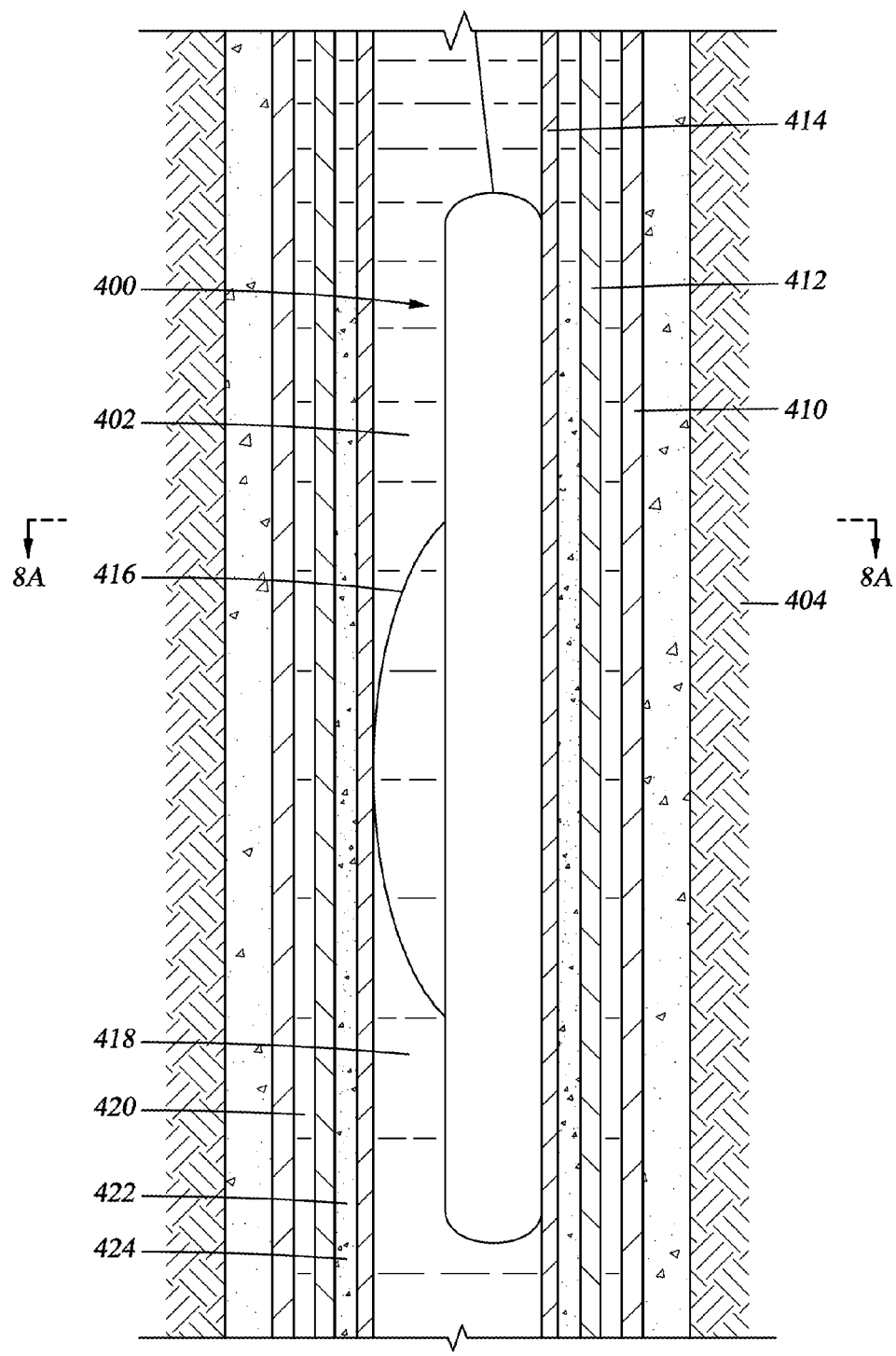
FIG. 7 is a side sectional view of a portion of FIG. 6 shown with additional detail.

Referring now to FIG. 7, shown in greater detail is a side sectional view of a portion of the embodiment of FIG. 6. Fluid 418 is shown in the example of FIG. 7 in the production tubing 414. Fluid 418 also occupies the higher length of an annulus 420 between the inner and outer strings of casing 410, 412 and a portion of an annulus 422 between the inner casing 412 and production tubing 414. Below the fluid 418 and annulus 422 is a substantially solid precipitate 424 that extends between the tubing 414 and inner casing 412. In the example of FIG. 7, the precipitate 424 adheres the tubing 414 with inner casing 412. In one example, the precipitate 424, which may fall out of or precipitate from the fluid 418, may be substantially made up of barite.

Figure 8A:
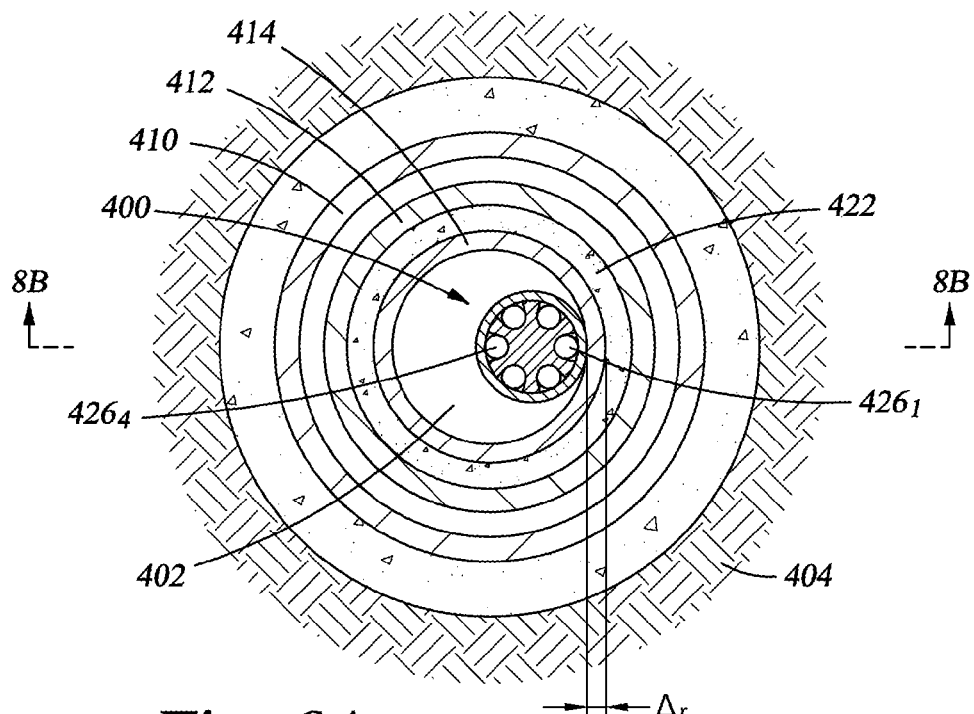
FIG. 8A is a lateral sectional view of the tool and wellbore of FIG. 7.

FIG. 8A is a sectional view of the tool 400 in the wellbore 402 taken along lines 8A-8A of FIG. 7. In the example of FIG. 8A, the production tubing 414 is substantially concentric within the inner casing 412. As such, in the example of FIG. 8A the thickness $\Delta r$ is substantially the same around the entire circumference of the annulus 422. Also illustrated in FIG. 8A are detectors $426_{1-6}$ that are provided within the body of the tool 400. In the example of FIG. 8A, the tool 400 is positioned against the inner surface of the tubing 414 so that detector $426_1$ is the closest detector to the side wall of the tubing 414. In contrast, detector $426_4$, which is illustrated as being about 180° from detector $426_1$, is the farthest detector from the sidewall of the tubing 414 against which the tool 400 is urged against.

Figure 8B:
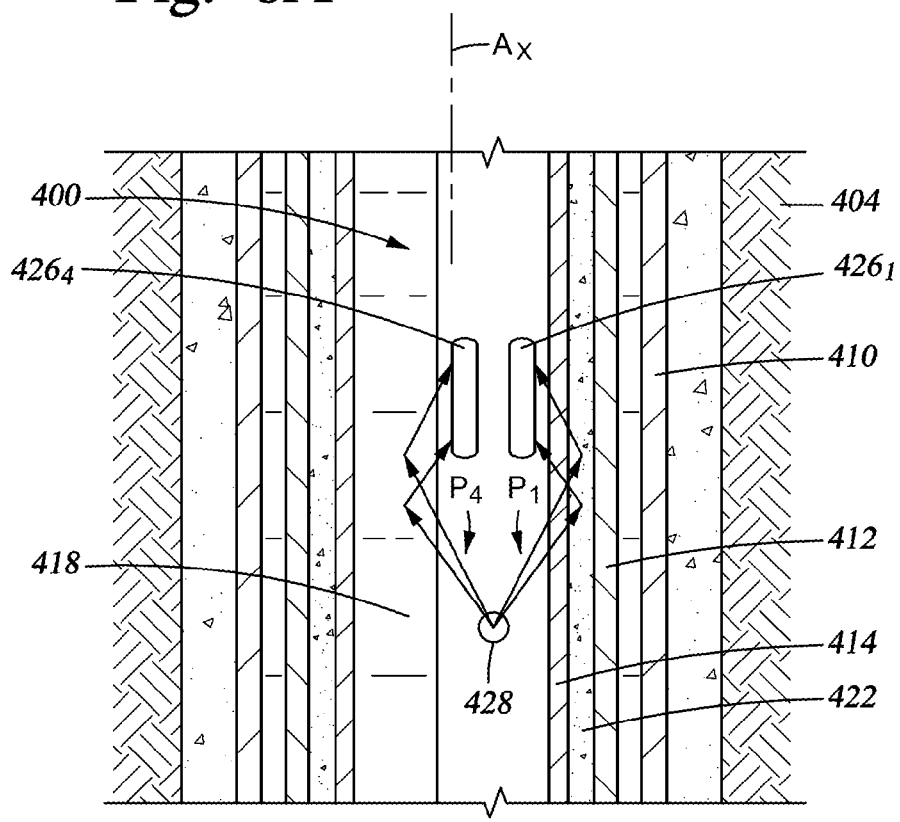
FIG. 8B is a side sectional view of the tool and wellbore of FIG. 8A.

Referring now to FIG. 8B, a side partial sectional view of the embodiment of FIG. 8A is shown taken along lines 8B-8B that depicts a spatial relationship of the detectors $426_1$, $426_4$ and a radiation source 428. In the example of FIG. 8B and as described above, radiation source 428 emits radiation that is directed along dedicated paths to enhance detection of those scattered gamma rays. Still referring to FIG. 8B, paths $P_1$, $P_4$ are shown that illustrate one example direction of radiation directed for detection respectively by detectors $426_1$, $426_4$.

By asymmetrically disposing the tool 400 within the tubing 414, radiation directed along path $P_1$ exit the tool 400 and pass through the tubing 414 and into the annulus 422. At least some of the radiation along $P_1$ that makes its way into the annulus 422 scatter back and is detected by detector $426_1$. As will be described in more detail below, analyzing the detected radiation from detector $426_1$ can provide information about material disposed within annulus 422. In contrast, radiation directed along Path $P_4$ makes its way from the tool 400 and is directed into the fluid 418 within the tubing 414. The strategic location of the source 428 and detector $426_4$ provide for detection of the radiation that primarily scatters from the fluid 418. Thus, in one example embodiment, a study of scattered radiation monitored by detector $426_4$ can provide a reference or basis for analysis of those scattered gamma rays detected by detector $426_1$.

Figure 9A:
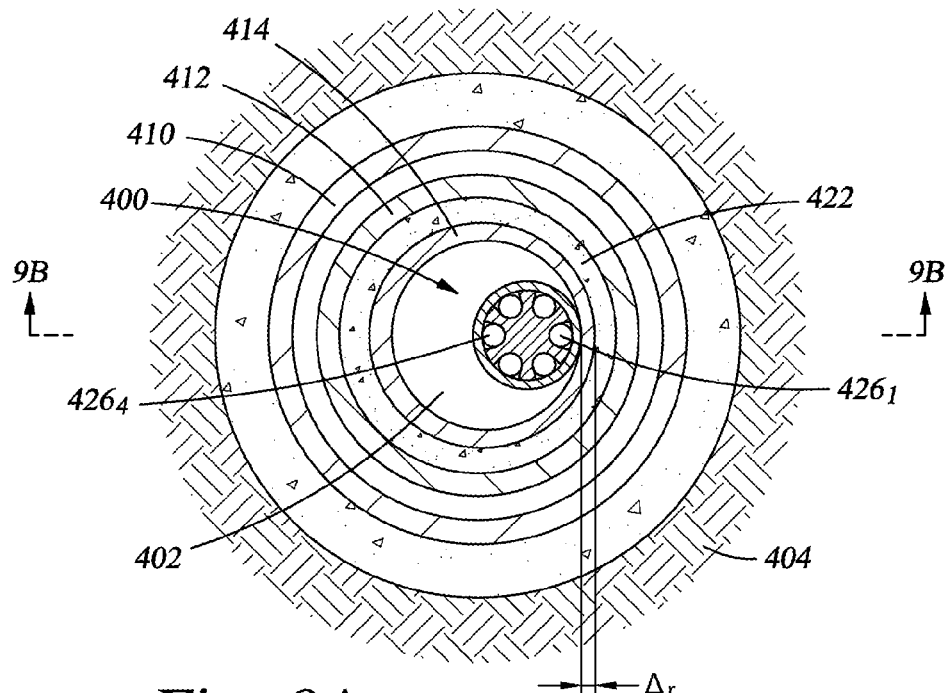
FIG. 9A is a lateral sectional view of the tool and wellbore of FIG. 7 with production tubing asymmetrically disposed within a casing string.
Figure 9B:
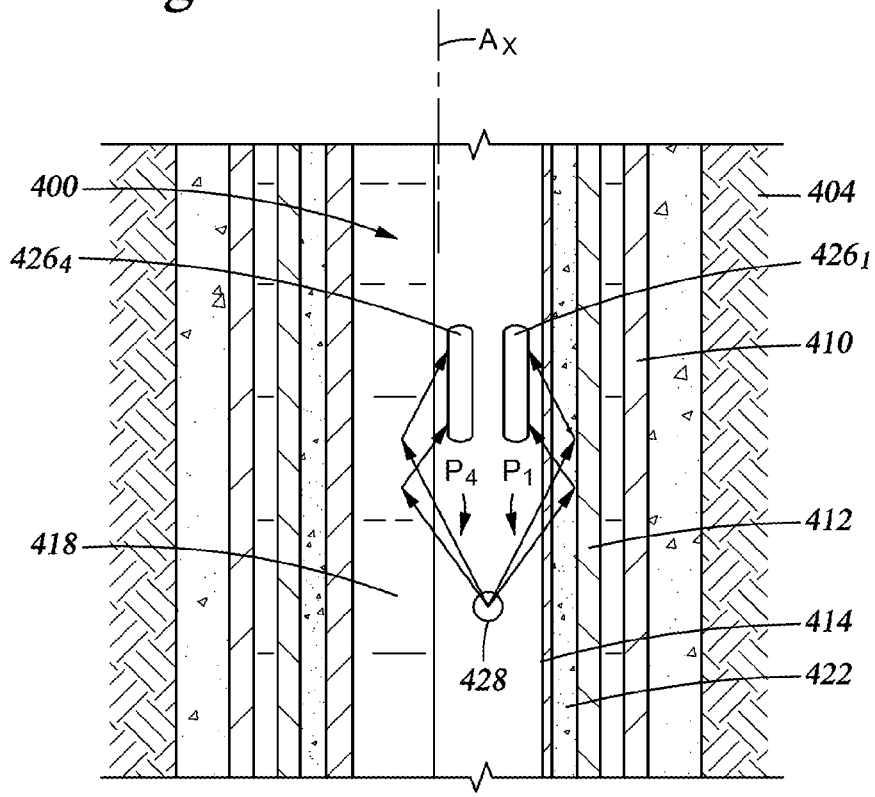
FIG. 9B is a side sectional view of the tool and wellbore of FIG. 9A.

FIG. 9A, like FIG. 8A, is a sectional view of an example of the tool 400 disposed in wellbore 402 taken lateral to axis $A_X$ of the wellbore 402 (FIG. 8B). In the example of FIG. 9A, the tubing 414 is asymmetrically disposed within the inner casing 412 so that the thickness $\Delta r_1$ of the annulus 422 adjacent where the tool 400 is located is less than other azithumal portions of the annulus 422. The asymmetric positioning of the tubing 414 is shown in a longitudinal sectional view in FIG. 9B, along with the representative directional paths $P_1$, $P_4$ illustrating example directions of radiation being emitted from the source 428.

Figure 10:
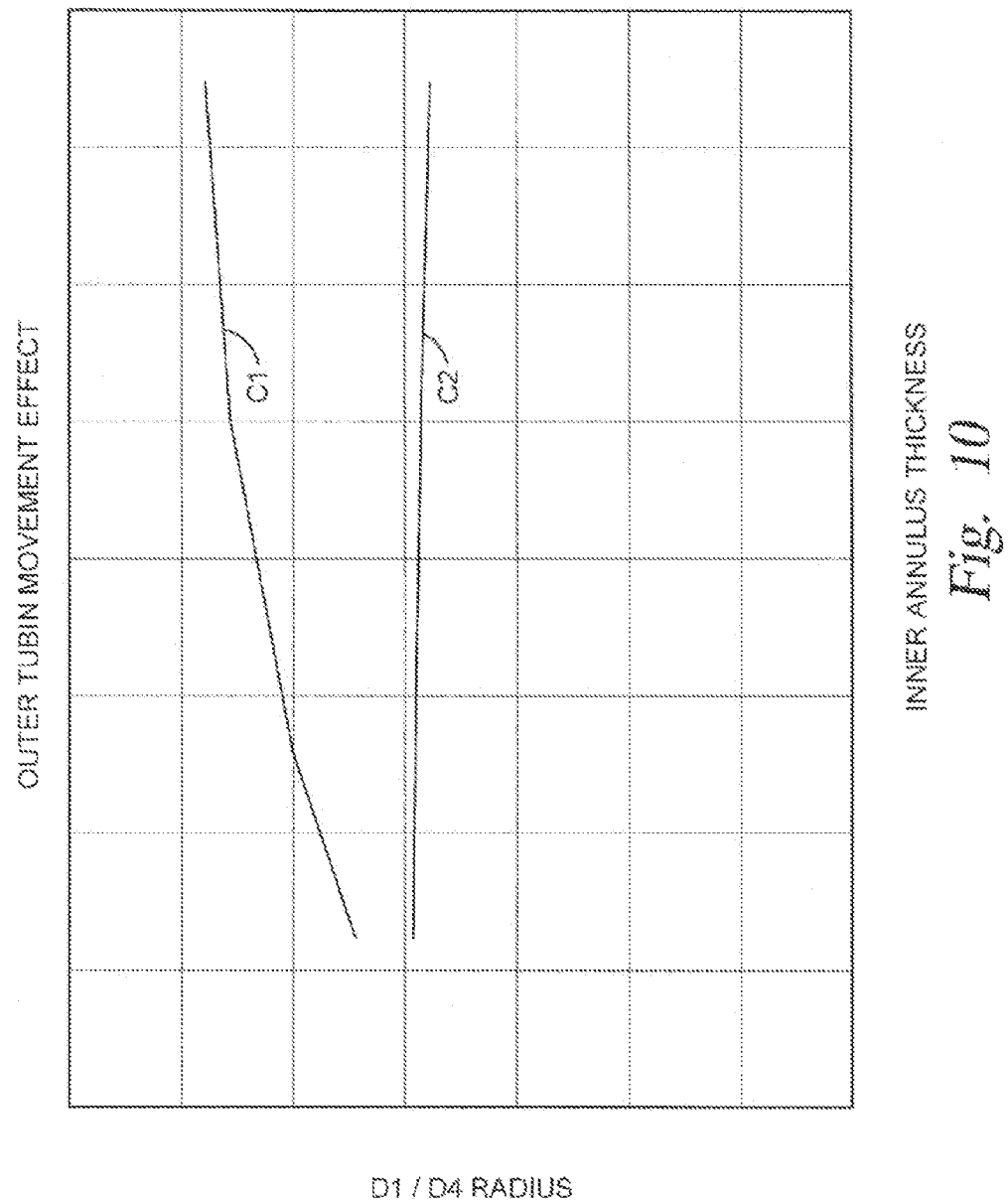
FIG. 10 is a graphical representation of changes in the thickness of annulus between concentric downhole tubulars and count rates of gamma rays reflected from materials in the annulus.

Referring now to FIG. 10, a simulated count rate as recorded by detectors $426_1$, $426_4$ is graphically provided. More specifically, curves $C_1$, $C_2$ respectively illustrate situations where count rates obtained by the detectors $426_1$, $426_4$ can vary with changes in the thickness of the annulus 418. Curve $C_1$ illustrates a simulated response wherein a liquid is present in the annulus 422. The abscissa of FIG. 10 represents a change in the thickness of the annulus, whereas the ordinate represents a ratio of the count rate of detector $426_1$ over the count rate of detector $426_4$. As shown, the ratio of the count rates of the detectors $426_1$, $426_4$ decreases with decreasing thickness of the annulus 422. The decrease in count rates may be attributed to more radiation passing entirely across the smaller width annulus 422 and into contact with the inner surface of the inner casing 412. The higher density of the material making up the casing 412 over that of the density of the liquid can attenuate the radiation so that scattering cannot be observed within the energy level of being detected by the detector $426_1$.

Curve $C_2$ of FIG. 10 represents a simulated example wherein the annulus 422 is substantially filled with a particulate matter such as a barite. In this example, the response ratio remains fairly consistent in spite of changes in thickness of the annulus 422. One plausible conclusion is that the rate of scattering of the radiation from barite is substantially the same as that of from material making up the inner casing 412. Equipped with this knowledge, the tool 400 may then be successfully deployed within concentric tubulars and used for determining the material within the annulus of separating the tubulars. Moreover, changes in coaxial orientation of the tubulars should not affect the ability of the tool to identify material within the annulus.

Figure 11:
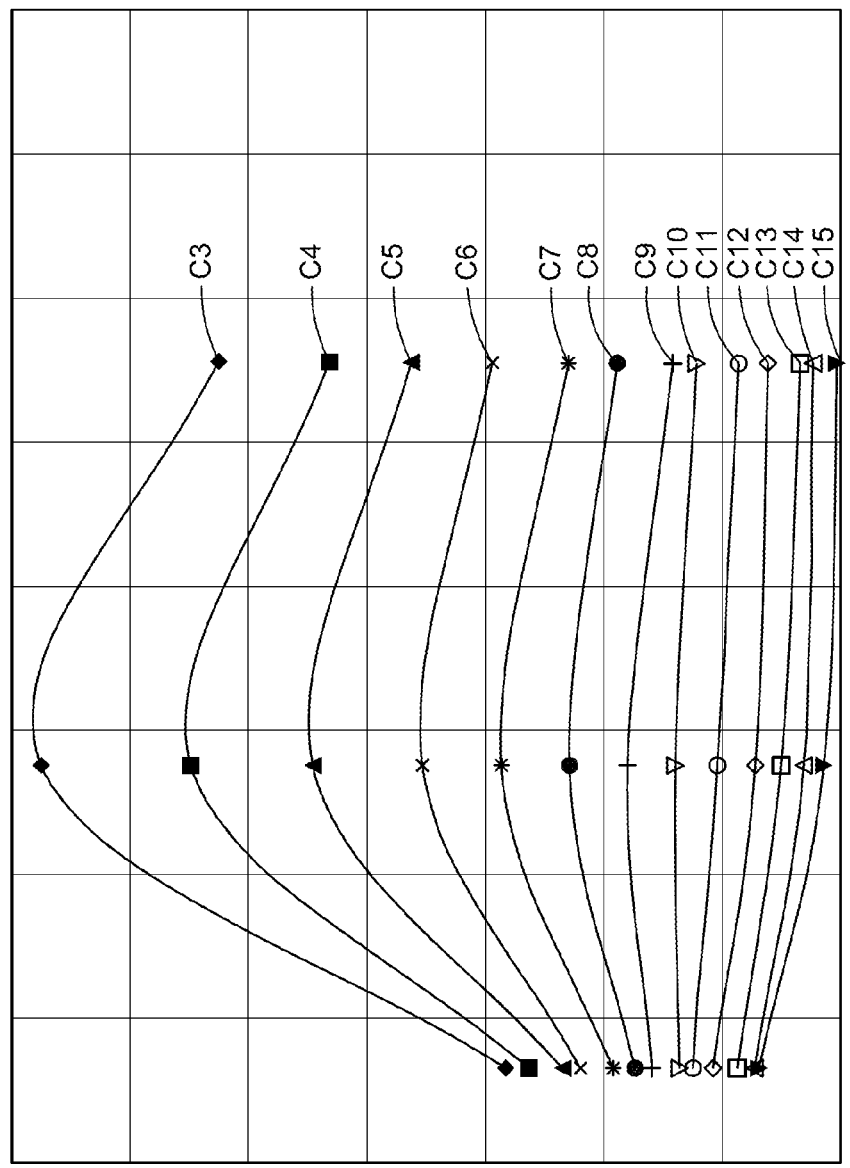
FIG. 11 is a graphical representation of changes in the thickness of annulus between concentric downhole tubulars and a measured response of gamma rays deflected from materials in the annulus.

FIG. 11 illustrates a series of plots $C_3$-$C_{15}$ that represent a count response detected by a detector of scattered radiation within various materials having a different density. More specifically, the density of the material represented by plot $C_3$ is about 10 pounds per gallon, the density of the material represented by each successive line increases by about two pounds per gallon. As such, the density of the material represented by plot $C_4$ is about 12 pounds per gallon and so on with the density of the material represented by plot $C_{14}$ to be around 32 pounds per gallon. Line $C_{15}$ represents barite. In this example, the abscissa represents thickness of the annulus and the ordinate represents the detected response. As can be seen from FIG. 11, the response remains more consistent with changes in annulus thickness for higher density substances as opposed to those of lower density. As with the case of the response of FIG. 10, the reduced thickness of the annulus allows radiation to contact the inner surface of the casing, thereby attenuating the radiation. A Monte Carlo modeling code MCMP was used as the modeling software that produced the data from which FIG. 11 was generated.

Figure 12A:
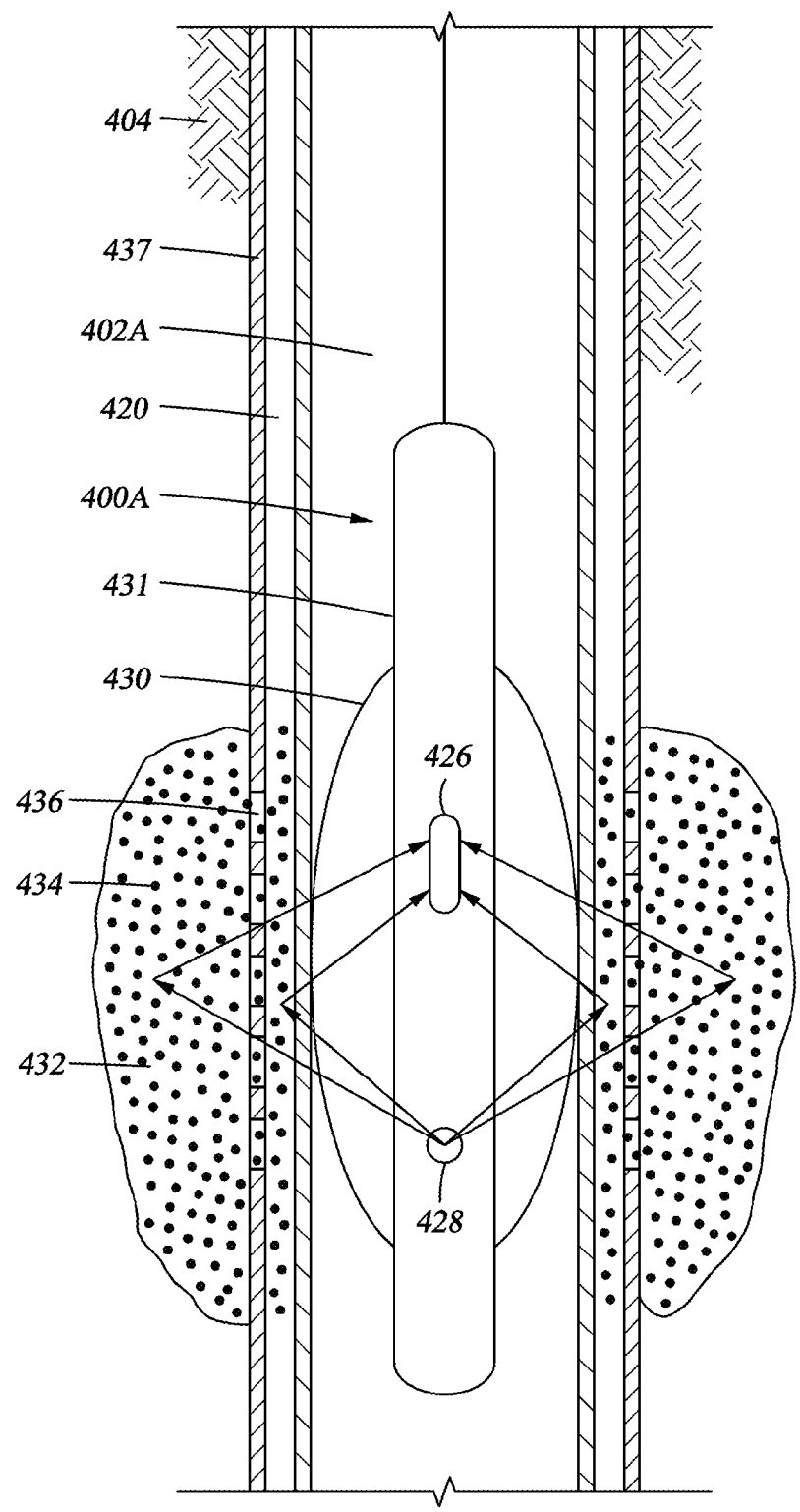
FIG. 12A is a side partial sectional view of an example of an imaging tool in a wellbore obtaining a baseline image of a gravel pack in accordance with the present invention.
Figure 12B:
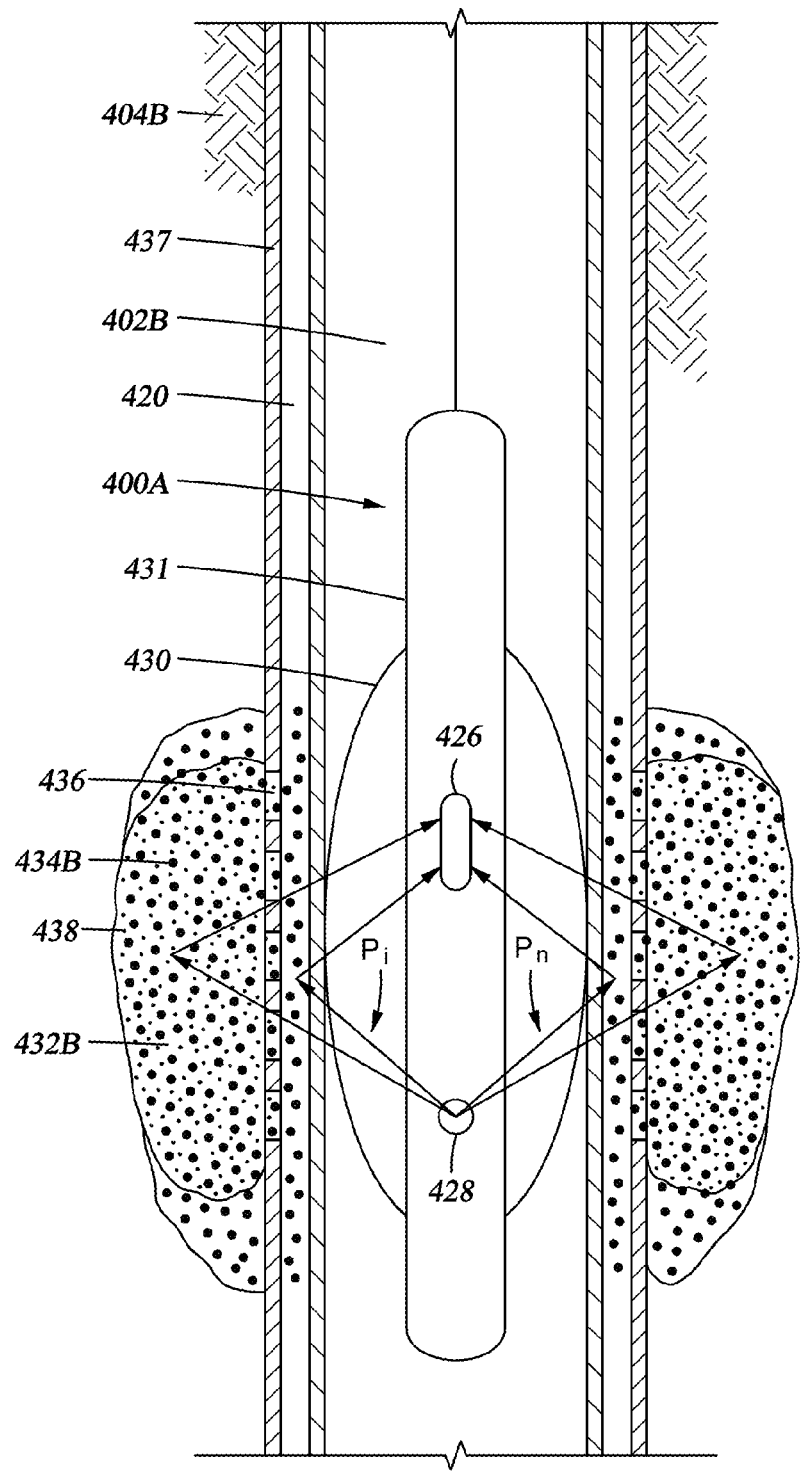
FIG. 12B is a side partial sectional view of the tool of FIG. 12A imaging the gravel pack at a time after that of FIG. 12A in accordance with the present invention.

Referring now to FIG. 12A, an example of a tool 400A imaging in a wellbore 402A is shown in a side partial sectional view. In this example a centralizer 430 is provided on a body 431 of the tool 400A and maintains the tool 400A proximate the mid portion of the wellbore 402A. A portion of the wellbore 402A adjacent the tool 400A is shown having a gravel pack 432 that is made up of a number of pellets 434, such as a proppant. Some of the gravel pack 432 is disposed in the annulus 420 and some extends radially outward into the surrounding formation 404A through perforations 436 in casing 437 shown lining the wellbore 402A. In the example of FIGS. 12A and 12B a single string of casing is in the wellbore 402A. In an alternate embodiment, the portion of the casing 437 having the perforations 436 can be a sleeve coupled with the remaining string of casing 437. Moreover, a screen (not shown) can be incorporated into the production tubing 414 for filtering sand and other particulates from entering the production tubing 414. As described in more detail above, the gravel pack 432 can be imaged by directed radiation from the source 428 along paths where scattering of the radiation is detected with detector 426. While a single detector 426 is illustrated in the embodiment of FIG. 12A, multiple detectors 426 could be included. In one example of use, the imaging of the gravel pack 432 obtained by the tool 400A, including other portions of the wellbore 402A or formation 404A, can provide a "baseline" image of the gravel pack 432.

In one example the baseline image can be obtained before any fluid production through the gravel pack 432 has taken place. Referring now to FIG. 12B, a side partial sectional view of an example of how flowing fluid over a period of time through the gravel pack 432B from the formation 404B can introduce an amount of detritus 438 into the gravel pack 432B. In one example, the detritus 438 includes fines and other solid particles that occupy interstices between the pellets 434B that make up the gravel pack 432B thereby restricting flow of fluid from the formation 404B through the gravel pack 432B and into the wellbore 402B. By deploying the tool 400A into the wellbore 402B and directing radiation from the source 428 along paths $P_i$-$P_n$, and to the detector 426, as shown in FIG. 12B, an image of the detritus 438 in the gravel pack 432B can be obtained. Thus the presence of the detritus 438 can be identified or confirmed by comparing a baseline image of the gravel pack 432 with the later obtained image.

Figure 12C:
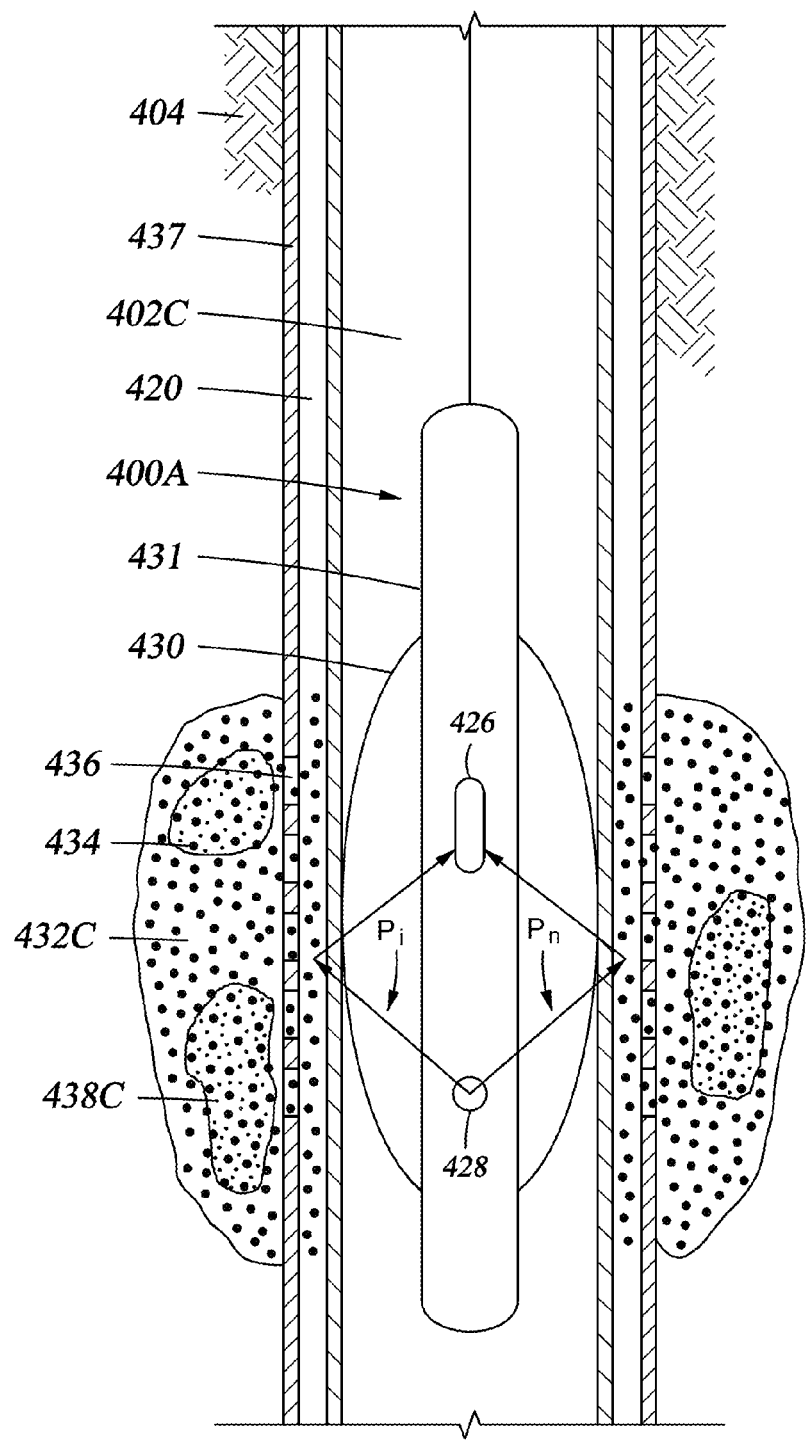
FIG. 12C is a side partial sectional view of an example of an imaging tool imaging a gravel pack after a step of remediation of the gravel pack in accordance with the present invention.

In one example, the baseline image can be obtained prior to remediating or repairing the gravel pack 432, where one example of remediation/repair is an acidizing procedure. Referring now to FIG. 12C, the wellbore 402C is being imaged with the tool 400A after operations for repairing or remediating the gravel pack 432C have taken place. In the example of FIG. 12C, the gravel pack 432C continues to contain detritus 438C that was not removed during the attempted repair. As such, by imaging the gravel pack 432C with the tool 400A as shown, radiation from the source 428 scatters from within the gravel pack 438C and detected by detector 426. Thus analysis of the detected scatter can reveal the presence of and a location of the remaining detritus 438C. The imaging the wellbore 402C with the tool 400A after a repair or remediation of the gravel pack 432C can verify the repair procedure was successful, and if not, can reveal at what depth and azimuth detritus 438C remains in the gravel pack 432C. Based on this information, decisions for future or additional repair/remediation can be made.

Figure 13:
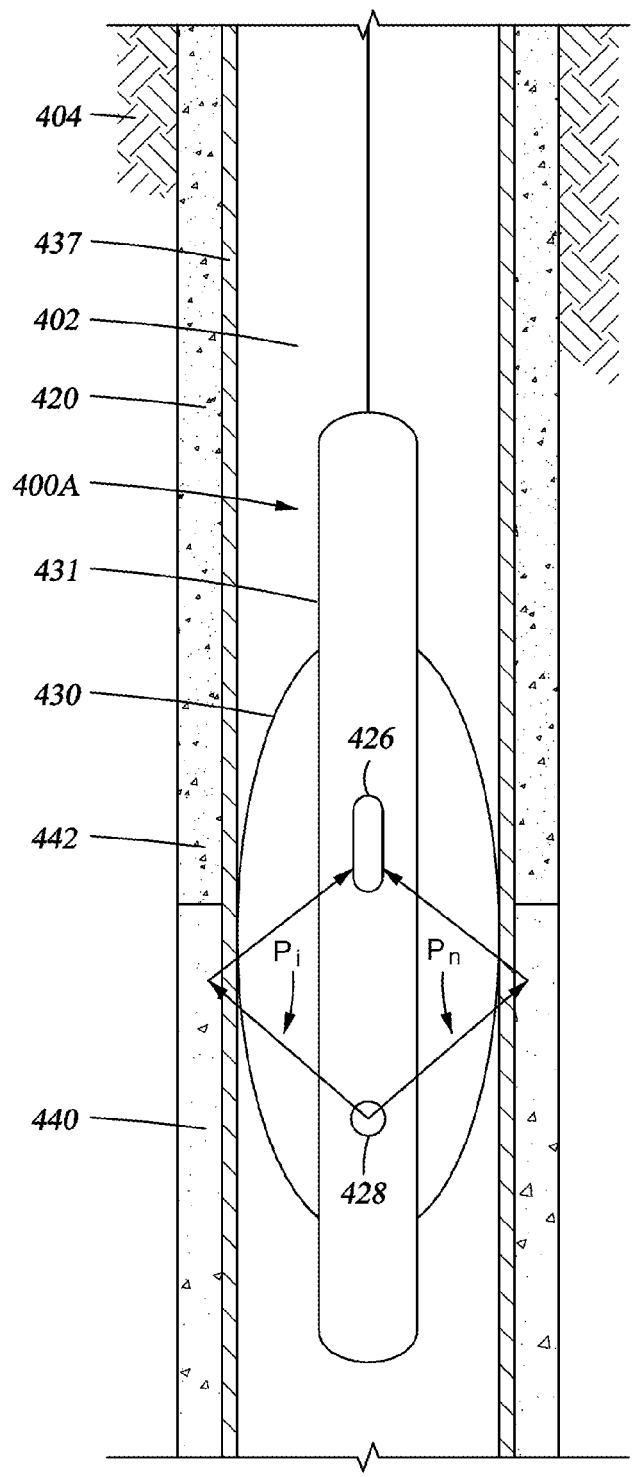
FIG. 13 is a side partial sectional view of an example embodiment of an imaging tool imaging a casing bond in accordance with the present invention.

In FIG. 13, a side sectional view of an example embodiment of the 400A is shown disposed in a wellbore 402 where different types of and/or weight densities of cement are in place between casing 437 and the surrounding formation 404. More specifically, a portion of the cement bond is made up of a light weight cement 440 shown disposed in the annulus 420. In one example, light weight cement describes cement between a casing and formation having a density of up to around 12 pounds/gallon. Also illustrated in the example of FIG. 13 is a standard weight cement 442 disposed in the annulus 420 above the light weight cement 440. For the purposes of discussion herein, standard weight cement can include cements between a casing and formation having a density greater than around 12 pounds/gallon. The tool 400A of FIG. 13 is configured so that radiation from its source 428 is directed along paths $P_i$-$P_n$ and that scatters of the radiation that occur from within the annulus 420 having the cement 440, 442 are sensed by the detector 426. Because of the sensitivity and resolution of the tool 400A, the radiation will scatter from the light weight cement 440 differently from how it will scatter from the standard weight cement 442. Moreover, an analysis of the differences in sensing of the detector 426 when the tool 400A is disposed adjacent the different cements 440, 442, can identify the respective locations of these different cements 440, 442.

Figure 14:
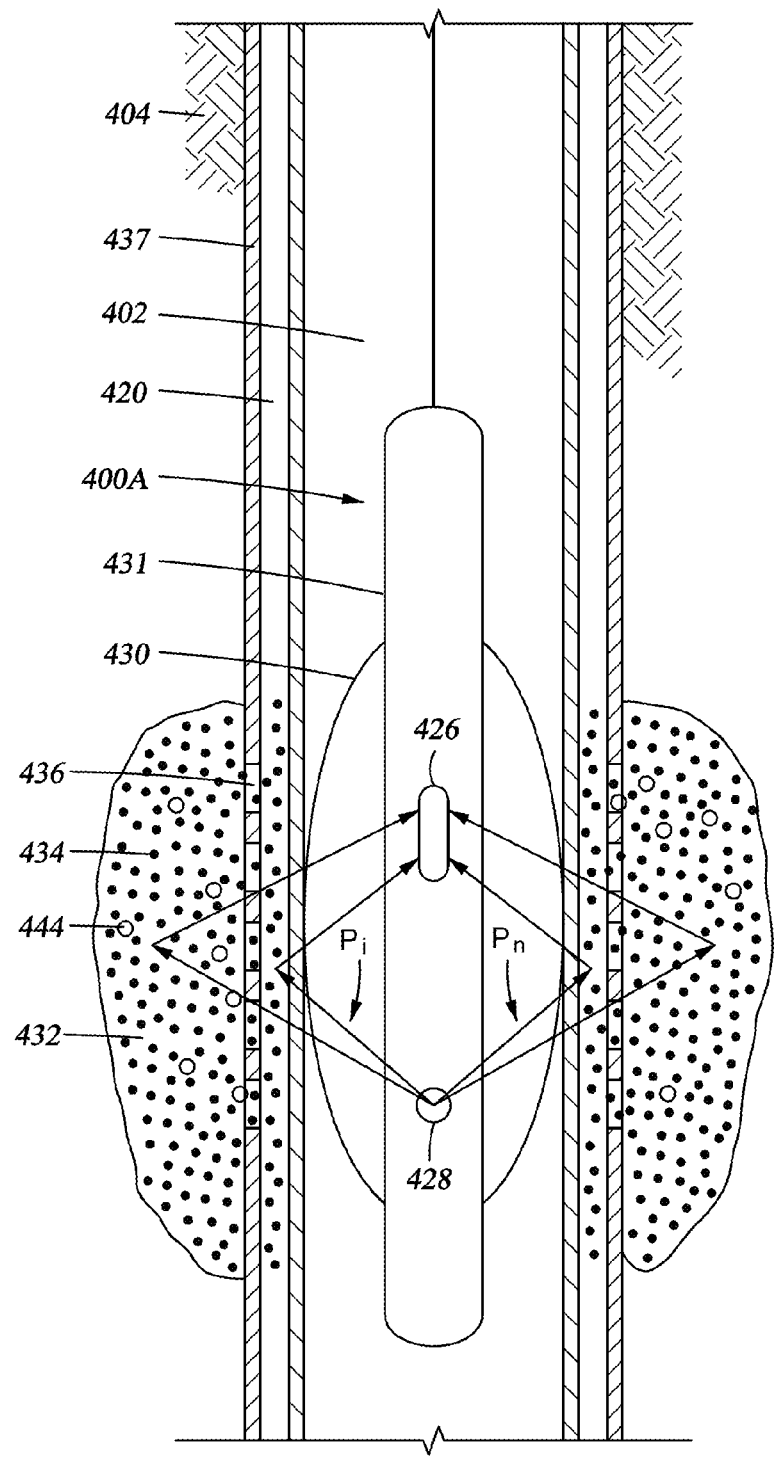
FIG. 14 is a side partial sectional view of an example embodiment of an imaging tool imaging asphaltenes in a gravel pack in accordance with the present invention.

With reference now to FIG. 14, an example of the tool 400A is depicted in a side partial sectional view disposed in a wellbore 402 wherein asphaltenes 444 are being produced from the formation 404. In this example, the asphaltenes 444 can become lodged in the gravel pack 432 as well as the perforation 436 in the casing 437. Similar to the example of operation of FIG. 13, radiation from the source 428 in the tool 400A is directed radially outward from the tool 400A so that some of the radiation scatters from asphaltenes 444 in the gravel pack 432 or screen 436. Sensing the radiation scatter with the detector 426 and analysis the results of the sensing can indicate the presence and/or location of asphaltenes 444 in the gravel pack 432 or screen 436. In one example, the presence of asphaltenes are detected by limiting an energy level(s) of the radiation sensed with the detector 426 to be consistent with an energy level(s) of radiation known to scatter from asphaltenes 444.

Figure 15:
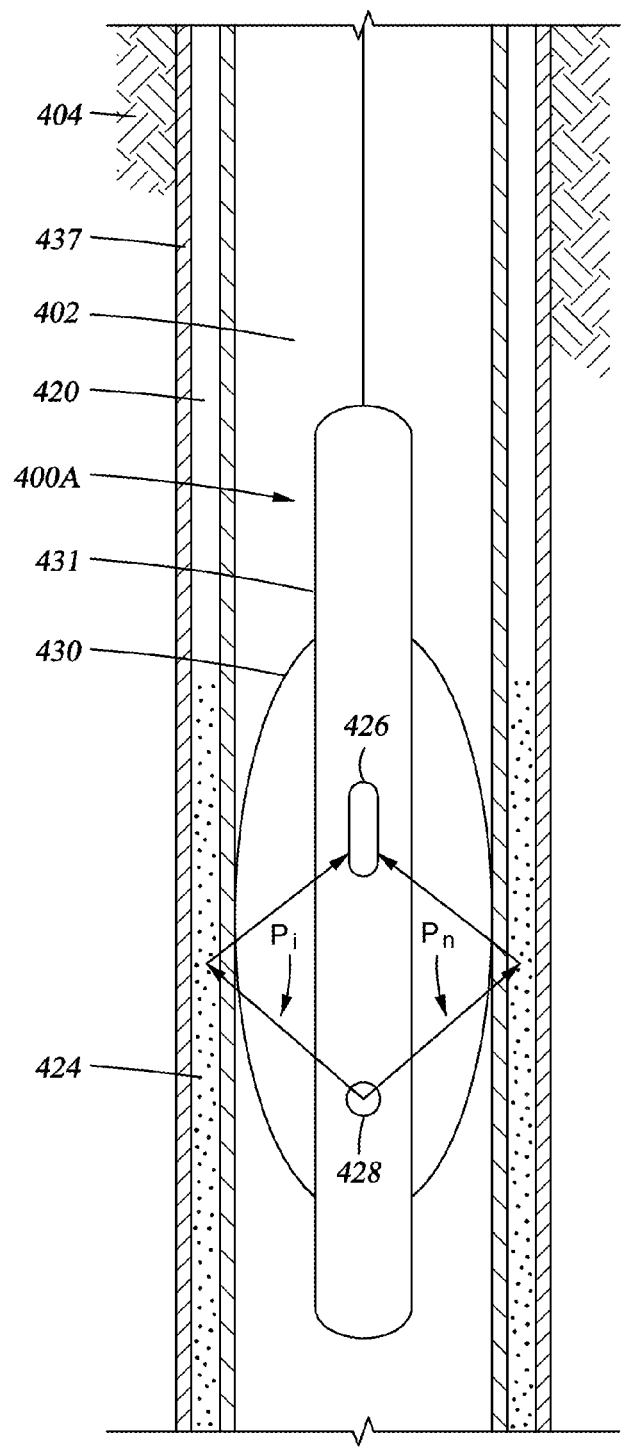
FIG. 15 is a side partial sectional view of an alternate embodiment of the imaging tool of FIG. 6 shown substantially centralized in a wellbore.

In FIG. 15, an example embodiment of the tool 400A is shown in a side partial section view. In this example the tool 400A is equipped with a centralizer 430 that positions the tool 400A towards the mid-portion of the wellbore 402. Radiation is directed from the source 428 along paths $P_i$-$P_n$ so that the radiation that scatters from annulus 420 can be sensed by receiver(s) 426. In one example, strategically forming collimator 328 (FIG. 3B) and spatially locating the source 428 and detector(s) 426 enables sensing of desired radiation scatter by the detector(s) 426. Also optionally, monitoring scatter in a selective energy range can indicate the material disposed in the annulus 420. In the example of FIG. 15, precipitate 424 is detected in the annulus 420 by analyzing the counts of scattered radiation sensed by the sensor(s) 426, where the precipitate 424 can include barite.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of investigating a subterranean wellbore comprising:
   a. providing a downhole tool having a radiation source;
   b. disposing the downhole tool in the subterranean wellbore;
   c. directing radiation from the source into an annulus between the downhole tool and a wall of the subterranean wellbore so that the radiation scatters back to a detector on the downhole tool;
   d. detecting radiation that single scattered back into the detector from the annulus;
   e. identifying a material in the annulus based on a count rate of detected radiation; and
   f. repeating steps (a)-(c) at a different depth in the wellbore and where a thickness of the annulus varies around a circumference of the annulus, so that a detectable amount of energy of the at least some of the radiation is attenuated within an outer tubular that circumscribes the annulus.

2. The method of claim 1, wherein the radiation comprises a gamma ray from a gamma ray source having an energy of from about 250 keV to about 700 keV and wherein the scattered radiation when detected has an energy of from about 50 keV to about 350 keV.

3. The method of claim 1, wherein the radiation comprise a first set of radiation and the path comprises a first path, the method further comprising:
   directing a second set of radiation along a second path having an azimuthal component that is substantially 180° from an azimuthal component of the first path so that at least some of the second set of radiation scatter from fluid disposed in the tubular, and detecting the scattered second set of radiation, wherein the step of identifying a material in the annulus is further based on a rate of detection of the second set of radiation.

4. The method of claim 3, further comprising:
   detecting a fluid in the annulus when a ratio of the rate of detection of the first set of radiation over the rate of detection of the second set of radiation reduces when the thickness reduces.

5. The method of claim 4, further comprising detecting a substantially solid material in the annulus when a ratio of the rate of detection of the first set of radiation over the rate of detection of the second set of radiation remains substantially the same with changes in the thickness.

6. The method of claim 1, wherein the count rate of detected radiation increases with increasing density of material in the annulus.

7. The method of claim 1, wherein the annulus is adjacent a tubular disposed in the subterranean wellbore.

8. A method of interrogating an annulus between an inner tubular and an outer tubular that are parallel and disposed in a subterranean wellbore, the method comprising:
   a. providing a gamma ray source disposed in a logging instrument against an azimuthal section of the inner tubular;
   b. using a collimator in the logging instrument to direct gamma rays from the source so that some of the gamma rays travel through the sidewall of the logging instrument, into the annulus and single scatter from a material in the annulus back into the inner tubular, and so that some of the gamma rays travel away from the azimuthal section of the logging instrument and single scatter from a fluid in the inner tubular;
   c. detecting the single scattered gamma rays and classifying gamma rays that single scatter from the fluid in the inner tubular and those that single scatter from the material in the annulus; and
   d. estimating a density of the material in the annulus based on a count rate of detection of the scattered gamma rays, wherein a rate of detection of gamma rays deflecting from fluid in the wellbore is used as a reference for determining the material in the annulus.

9. The method of claim 8, wherein a conically shaped guide is provided proximate the gamma ray source and positioned in the logging instrument so that an apex of the guide is directed towards the source and the guide has an axis that is substantially parallel with an axis of the inner tubular.

10. The method of claim 8, wherein a detector is disposed from about 2 inches to about 4 inches from the gamma ray source and wherein the detector is used to detect the single scattered gamma rays.

11. The method of claim 8, wherein a collimator is used to strategically direct the gamma rays away from the source at an angle oblique to an axis of the inner tubular and along discrete paths disposed azimuthally around the gamma ray source, so that strategically located detectors respectively detect scattering from discrete azimuthal areas spaced radially outward from the gamma ray source.

12. The method of claim 8, further comprising repeating steps (a)-(d) at different depths in a section of the wellbore and identifying a substantially solid material in the annulus when a ratio of a rate of gamma rays detected that are scattered from the annulus over a rate of gamma rays detected that are scattered from the fluid in the inner tubular remains substantially the same with changes in thickness of the annulus.

13. The method of claim 8, further comprising repeating steps (a)-(d) at different depths in a section of the wellbore and identifying a substantially liquid material in the annulus when a ratio of a rate of gamma rays detected that are scattered from the annulus over a rate of gamma rays detected that are scattered from the fluid in the inner tubular is reduced with a reduction in thickness of the annulus.

14. A method of analyzing an annulus between an inner tubular and an outer tubular that are parallel and disposed in a subterranean wellbore, the method comprising:
   a. providing a gamma ray source disposed in a logging instrument against an azimuthal section of the inner tubular;
   b. directing gamma rays from the source so that some of the gamma rays travel into the annulus and scatter from a material in the annulus back into the inner tubular, and so that some of the gamma rays travel away from the azimuthal section and scatter from a fluid in the inner tubular;
   c. detecting the scattered gamma rays and classifying gamma rays that scatter from the fluid in the inner tubular and those that scatter from the material in the annulus;
   d. identifying the material in the annulus based on a rate of detection of the scattered gamma rays; and
   e. repeating steps (a)-(d) at different depths in a section of the wellbore,
      identifying a substantially solid material in the annulus when a ratio of a rate of gamma rays detected that are scattered from the annulus over a rate of gamma rays detected that are scattered from the fluid in the inner tubular remains substantially the same with changes in thickness of the annulus, and identifying a substantially liquid material in the annulus when a ratio of a rate of gamma rays detected that are scattered from the annulus over a rate of gamma rays detected that are scattered from the fluid in the inner tubular is reduced with a reduction in thickness of the annulus.

15. The method of claim 14, further comprising repeating step (e) along sections of the wellbore that are at different depths.

16. The method of claim 14, wherein the rate of gamma rays that are scattered from the fluid in the tubular comprises a reference value for use in identifying a liquid in the annulus.

17. A method of interrogating an annulus between an inner tubular and an outer tubular that parallel and are disposed in a subterranean wellbore, the method comprising:

a. providing a gamma ray source disposed in a logging instrument against an azimuthal section of the inner tubular;

b. using a collimator in the logging instrument to direct gamma rays from the source so that some of the gamma rays travel through the sidewall of the logging instrument, into the annulus and single scatter from a material in the annulus back into the inner tubular, and so that some of the gamma rays travel away from the azimuthal section of the logging instrument and single scatter from a fluid in the inner tubular;

c. detecting the single scattered gamma rays and classifying gamma rays that single scatter from the fluid in the inner tubular and those that single scatter from the material in the annulus;

d. estimating a density of the material in the annulus based on a count rate of detection of the scattered gamma rays; and e. repeating steps (a)-(d) at different depths in a section of the wellbore and identifying a material in the annulus when a ratio of a rate of gamma rays detected that are scattered from the annulus over a rate of gamma rays detected that are scattered from the fluid in the inner tubular, the material being identified as substantially solid when the ratio of a rate of gamma rays detected remains substantially the same with changes in thickness of the annulus, and the material being identified as substantially liquid when the ratio of a rate of gamma rays detected is reduced with a reduction in thickness of the annulus.

* * * * *